(12) United States Patent
Kiuchi et al.

(10) Patent No.: US 10,564,058 B2
(45) Date of Patent: Feb. 18, 2020

(54) DYNAMOMETER LOAD DEVICE

(71) Applicant: TOYO CORPORATION, Tokyo (JP)

(72) Inventors: Takeo Kiuchi, Tokyo (JP); Takashi Kimura, Tokyo (JP)

(73) Assignee: TOYO Corporartion, Tokyo (JP)

( * ) Notice: Subject to any disclaimer, the term of this patent is extended or adjusted under 35 U.S.C. 154(b) by 0 days.

(21) Appl. No.: 16/475,919

(22) PCT Filed: Jun. 8, 2017

(86) PCT No.: PCT/JP2017/021403
§ 371 (c)(1),
(2) Date: Jul. 3, 2019

(87) PCT Pub. No.: WO2018/225233
PCT Pub. Date: Dec. 13, 2018

(65) Prior Publication Data
US 2019/0383680 A1   Dec. 19, 2019

(51) Int. Cl.
| | | |
|---|---|---|
| *G01L 3/24* | (2006.01) | |
| *G01L 3/16* | (2006.01) | |
| *B60W 50/04* | (2006.01) | |
| *B60W 50/00* | (2006.01) | |
| *G01M 17/00* | (2006.01) | |
| *G01M 15/02* | (2006.01) | |

(52) U.S. Cl.
CPC .............. *G01L 3/242* (2013.01); *B60W 50/04* (2013.01); *G01L 3/16* (2013.01); *B60W 2050/0068* (2013.01); *B60W 2510/20* (2013.01); *G01M 15/02* (2013.01); *G01M 17/00* (2013.01)

(58) Field of Classification Search
CPC ...... G01M 15/00; G01M 15/02; G01M 17/00; G01L 3/242; G01L 3/16; B60W 50/04; B60W 2050/0068; B60W 2510/20
See application file for complete search history.

(56) References Cited

U.S. PATENT DOCUMENTS

| | | | |
|---|---|---|---|
| 5,323,644 A | * | 6/1994 | Schaefer ............... G01M 17/06 73/116.06 |
| 5,402,676 A | | 4/1995 | Shibayama et al. |
| 6,006,611 A | | 12/1999 | Galvin et al. |

(Continued)

FOREIGN PATENT DOCUMENTS

| | | |
|---|---|---|
| JP | 5-240744 | 9/1993 |
| JP | 2777945 | 7/1998 |

(Continued)

OTHER PUBLICATIONS

International Search Report (ISR) dated Jul. 4, 2017 in International (PCT) Application No. PCT/JP2017/021403.

(Continued)

*Primary Examiner* — Jonathan M Dunlap
(74) *Attorney, Agent, or Firm* — Wenderoth, Lind & Ponack, L.L.P.

(57) ABSTRACT

A dynamometer load device applies a load to a dynamometer unit that is connected to a hub of a wheel of a motor vehicle and being movable. The dynamometer load device applies, in conjunction with steering of the motor vehicle, a load to the dynamometer unit turning along with the hub. The load is applied in a direction opposite to a turning direction of the dynamometer unit.

12 Claims, 23 Drawing Sheets

(56) References Cited

U.S. PATENT DOCUMENTS

| | | | | |
|---|---|---|---|---|
| 6,044,696 A * | 4/2000 | Spencer-Smith | ... | G01M 17/007 |
| | | | | 73/116.06 |
| 8,001,835 B2 | 8/2011 | Engström | | |
| 8,387,449 B2 * | 3/2013 | Engstrom | ......... | G01M 17/0072 |
| | | | | 73/114.15 |
| 8,505,374 B1 * | 8/2013 | Arseneau | ................... | G01L 3/24 |
| | | | | 73/116.05 |
| 2010/0107750 A1 * | 5/2010 | Engstrom | ........... | G01M 15/044 |
| | | | | 73/116.05 |

FOREIGN PATENT DOCUMENTS

| | | |
|---|---|---|
| JP | 10-508685 | 8/1998 |
| WO | 96/06337 | 2/1996 |

OTHER PUBLICATIONS

Written Opinion of the International Searching Authority dated Jul. 4, 2017 in corresponding International Application No. PCT/JP2017/021403 (with partial English translation).

* cited by examiner

DYNAMOMETER LOAD DEVICE

TECHNICAL FIELD

The present invention relates to a dynamometer load device for applying a load to a dynamometer.

BACKGROUND ART

Conventionally, a dynamometer has been used for testing the running performance of a motor vehicle in a developing field or a production field. There are known various dynamometers, among which is a dynamometer to be connected to a drive shaft of a motor vehicle. Such a dynamometer is, for example, directly connected to a hub of a driving wheel of a motor vehicle, and is subjected to rotational driving force during running from the motor vehicle. The dynamometer detects running performance such as an output, torque, rotational speed, and the like of the motor vehicle in a running state. Such a dynamometer which is connected to a hub is also referred to as a hub-coupled dynamometer. For example, Patent Literature 1 discloses a dynamometer which is connected to a hub of a motor vehicle. The dynamometer according to Patent Literature 1 is provided with a hydraulic pump having an input shaft which is connected to the hub of a motor vehicle. The hydraulic pump rotates with the hub and the drive shaft of the motor vehicle while applying load thereto. The dynamometer detects torque, etc. of the motor vehicle in a running state from output pressure, etc. of the hydraulic pump.

CITATION LIST

Patent Literature

[PTL 1] Japanese Unexamined Patent Application Publication (Translation of PCT Application) No. 10-508685

SUMMARY OF INVENTION

Technical Problem

The hub-coupled dynamometer according to Patent Literature 1 cannot move on a supporting surface such as the ground surface or the floor surface on which it is disposed. In recent years, among the hub-coupled dynamometers, there are types which are provided with wheels such as casters so as to be movable in a state of being disposed on a supporting surface. Such a dynamometer can turn and move as the steering wheel of a motor vehicle is steered when it is connected to the hub of a front wheel of a front wheel drive motor vehicle. In this case, the dynamometer is in contact with the supporting surface instead of the front wheel of the motor vehicle, and turns even with a small steering force of the steering wheel. For this reason, the operator of steering wheel cannot obtain steering feel of the steering wheel and may be difficult to perform intended steering of the steering wheel.

The present invention provides a dynamometer load device that applies a load to a dynamometer which moves as the steering wheel is steered.

Solution to Problem

In accordance with an aspect of the present invention, there is provided a dynamometer load device that applies a load to a dynamometer unit, the dynamometer unit being connected to a hub of a wheel of a motor vehicle and being movable, wherein the dynamometer load device applies a load to the dynamometer unit in conjunction with steering of the motor vehicle, the dynamometer unit turning along with the hub, the load being applied in a direction opposite to a turning direction of the turning of the dynamometer unit.

Advantageous Effects of Invention

According to the dynamometer load device according to the present invention, it becomes possible to apply a load to a dynamometer unit which moves as the steering wheel is steered.

DESCRIPTION OF EMBODIMENTS

Hereinafter, embodiments according to the present invention are described in greater detail with reference to the accompanying Drawings. It should be noted that all the embodiments described below are generic and specific examples of the present invention. Numerical values, shapes, materials, constituent elements, arrangement positions and the connection configuration of the constituent elements, and the like described in the following embodiments are merely examples, and are not intended to limit the present invention. The present invention is characterized by the appended claims. Therefore, among the constituent elements in the following embodiments, constituent elements that are not described in independent claims that show the most generic concept of the present invention are described as elements constituting more desirable configurations, although such constituent elements are not necessarily required to achieve the object of the present invention.

It should also be noted that the following embodiments may include expressions using "substantially", such as substantially parallel and substantially perpendicular. For example, substantially parallel means not only completely parallel but also substantially parallel. For example, substantially parallel includes a difference of about several % from completely parallel. The other expressions using "substantially" have the same meaning.

Embodiment 1

Figure 1:
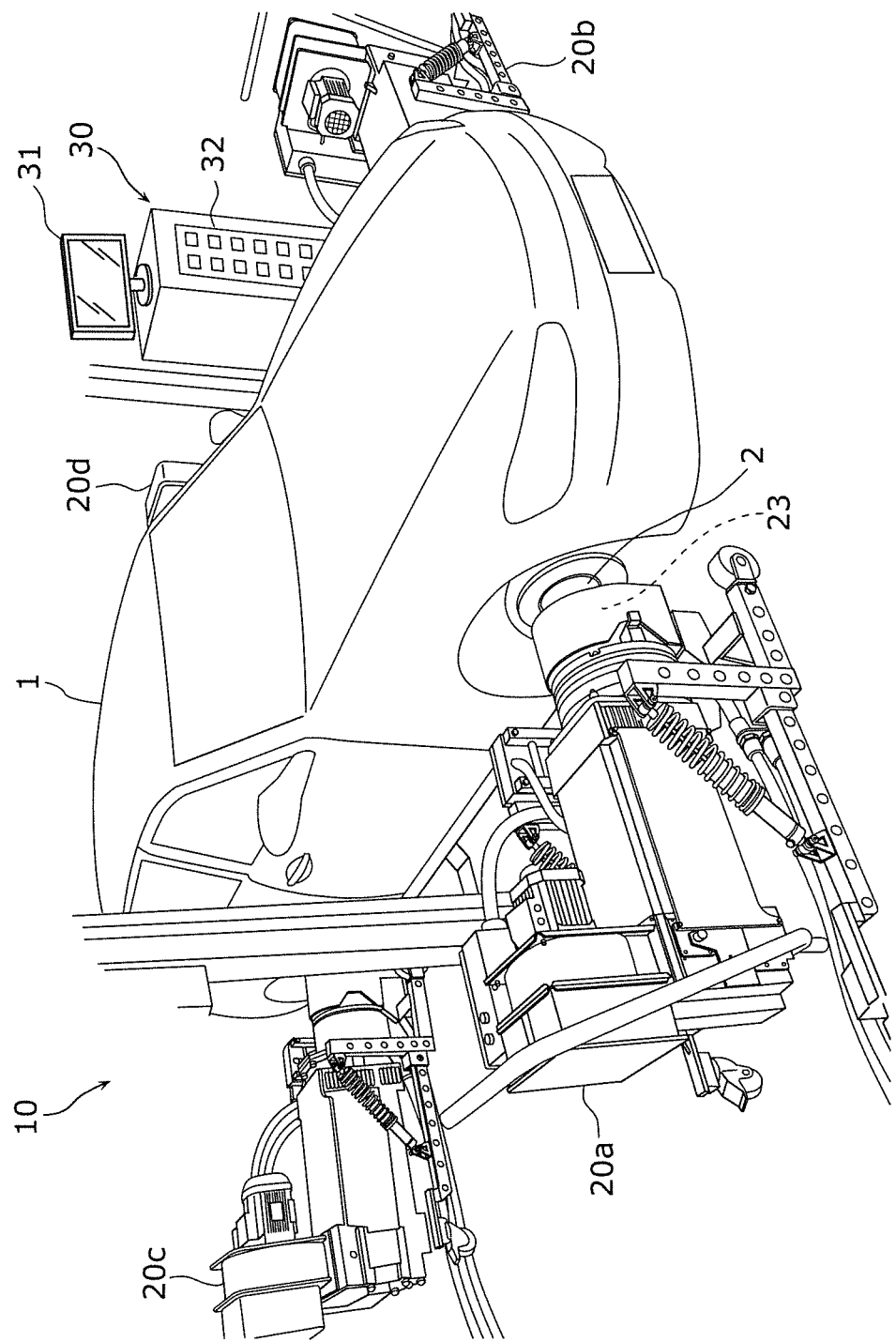
FIG. 1 is a schematic perspective view illustrating an example of a dynamometer to which a dynamometer load device according to Embodiment 1 is applied.

First, referring to FIG. 1, a dynamometer 10 to which a dynamometer load device 100 according to Embodiment 1 is applied will be described. Note that FIG. 1 is a schematic perspective view illustrating an example of the dynamometer to which the dynamometer load device 100 according to Embodiment 1 is applied. The dynamometer 10 is a hub-coupled dynamometer. The dynamometer 10 includes a plurality of dynamometer units 20a to 20d each of which is directly connected to a hub 2 of a motor vehicle 1, and a control unit 30 that controls the dynamometer units 20a to 20d.

In the example of FIG. 1, the motor vehicle 1 is a 4-wheel drive vehicle. Therefore, four dynamometer units 20a, 20b, 20c, and 20d are disposed. The dynamometer units 20a, 20b, 20c, and 20d are each connected to a hub 2 of the right front wheel, a hub 2 of the left front wheel (not shown), a hub 2 of the right rear wheel (not shown), and a hub 2 of the left rear wheel (not shown) of the motor vehicle 1, respectively by using a connecting fitting 23 not shown. For example, the connecting fitting 23 is attached and secured to a hub bolt of the hub 2 by using a nut as with a wheel for tire. The connecting fitting 23 connects the hub 2 to each of the dynamometer units 20a to 20d so as to be able to transfer driving force of the motor vehicle 1.

The dynamometer units 20a, 20b, 20c, and 20d each include a motor not shown. The rotating shaft of the motor is configured to be connected with the connecting fitting 23 so as to be able to transfer driving force. The rotating shaft of the motor can rotate coaxially in a single body with the connecting fitting 23 and the hub 2. When the motor vehicle 1 drives its drive shaft to rotate the hub 2, the motor is rotated by rotational driving force of the motor vehicle 1 which is transferred through the hub 2 and the connecting fitting 23. It is possible to detect driving force, that is, torque of the motor vehicle 1, and a rotational speed, etc. at each torque value by means of the output and rotational speed, etc. of the rotating motor. Further, as a result of power being supplied to the motor, and the motor generating torque in the opposite direction to the rotational direction of the hub 2, the motor can apply a load to the drive shaft of the motor vehicle 1. Note that the configuration of the dynamometer units 20a to 20d is not limited to that described above, and for example, it may be configured to include a pressure pump such as a hydraulic pump in place of the motor. It is possible to detect the torque of the motor vehicle 1 and rotational speed, etc. at each torque through the output and the rotational speed, etc. of the pressure pump.

The hubs 2 of the motor vehicle 1 to which the dynamometer units 20a to 20d are connected are supported on the supporting surface such as the ground surface and floor surface via, instead of tires, the dynamometer units 20a to 20d. As shown in example of FIG. 1, the motor vehicle 1 in which dynamometer units 20a to 20d are connected to the hubs 2 of four wheels is supported on the supporting surface via only the dynamometer units 20a to 20d, without being in contact with the supporting surface in any other area. Such a dynamometer 10 can realize a running state of the motor vehicle 1 with the position of the motor vehicle 1 being fixed.

The control unit 30 is made up of a computer. The control unit 30 includes a monitor 31 and an input device 32. The control unit 30 displays various kinds of information on the monitor 31. Moreover, the control unit 30 accepts various instructions such as conditions of the motor vehicle 1 and settings of running conditions of the motor vehicle 1 in a running test via the input device 32. The input device 32 may include, for example, a key, a key board, a mouse, a touch panel, and the like. The control unit 30 is electrically connected with each of the dynamometer units 20a to 20d. The control unit 30 detects the output and rotational speed of the motor of each dynamometer unit 20a to 20d, and outputs various information regarding the running performance of the motor vehicle 1 such as output, torque, engine rotational speed at each output value, engine rotational speed at each torque value, and the like of the motor vehicle 1 as information for each driving wheel or information for the entire motor vehicle 1. Moreover, the control unit 30 controls the motor of each dynamometer unit 20a to 20d based on running conditions and the like which are input via the input device 32. For example, the control unit 30 controls the load to be applied to each driving wheel of the motor vehicle 1 by adjusting the power to be supplied to the motor.

Figure 2:
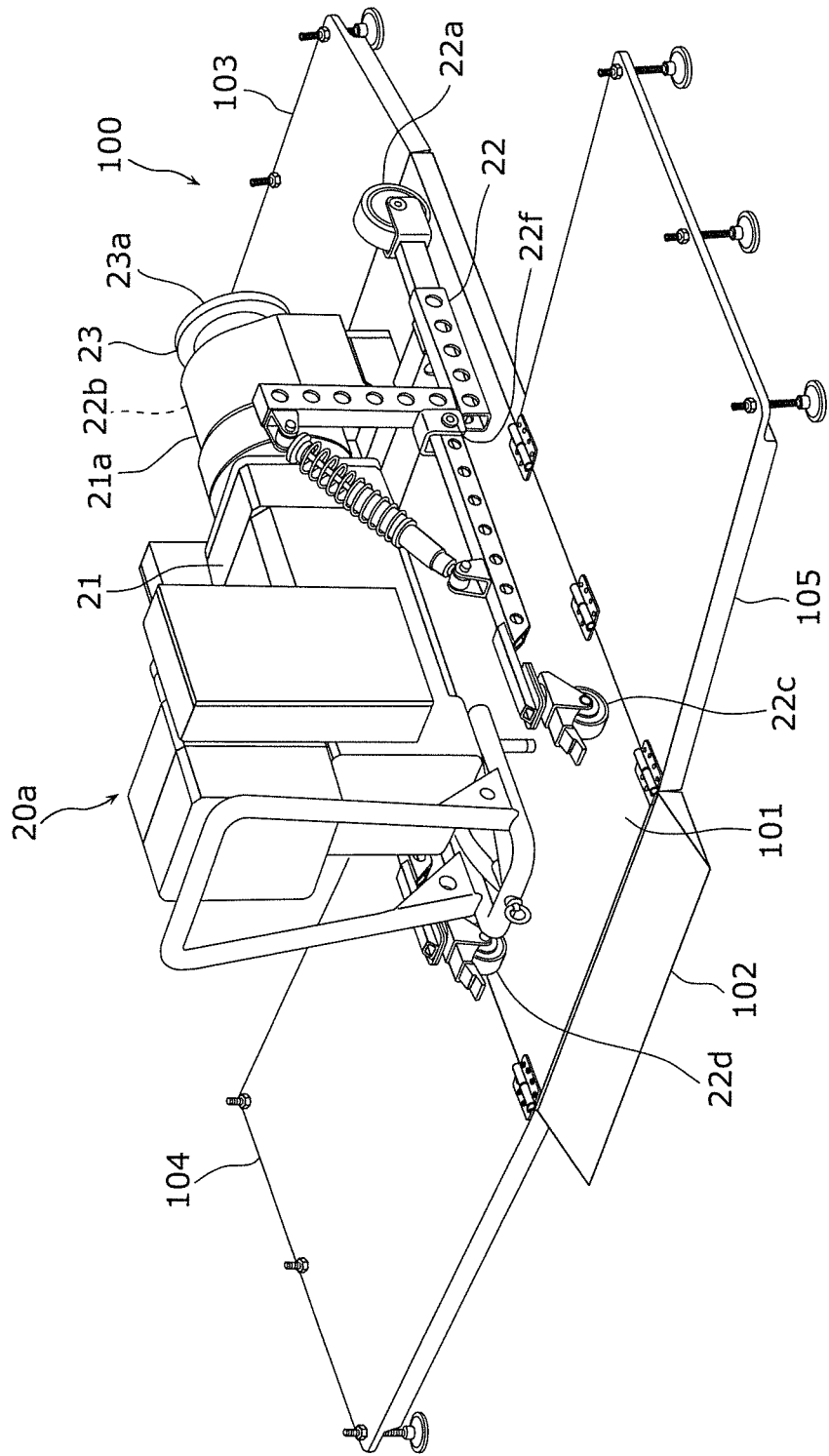
FIG. 2 is a schematic perspective view of a state in which the dynamometer load device according Embodiment 1 is set up with a dynamometer unit disposed on the right front wheel of the motor vehicle of FIG. 1 seen from the outside of the motor vehicle toward the motor vehicle.

Next, detailed configurations of the dynamometer load device 100 and the dynamometer units 20a to 20d according to Embodiment 1 will be described. Note that since the dynamometer units 20a to 20d each have a similar configuration, only the configuration of the dynamometer unit 20a will be described. Referring to FIG. 2, a state, in which the dynamometer load device 100 according to Embodiment 1 is set up with the dynamometer unit 20a disposed in the right front wheel of the motor vehicle 1 of FIG. 1, is shown by a schematic perspective view seen from the outside of the motor vehicle 1 toward the motor vehicle 1.

The dynamometer unit 20a includes a main body 21 having a motor (not shown) inside, a base frame 22 that supports the main body 21, and a connecting fitting 23. There is provided a rotating shaft extending from the motor within a connecting portion 21a extending from the main body 21. The connecting fitting 23 includes a flange 23a having an annular disc shape and to be connected to the hub 2 of the motor vehicle 1, and a connecting shaft (not shown) which is connected to the rotating shaft of the motor. The base frame 22 is provided with four wheels 22a to 22d.

The wheels 22a and 22b, whose advancing direction is fixed in one direction, are for example fixed casters. The wheels 22a and 22b operate in such a way to cause the base frame 22 to advance and retreat along the extending direction of the connecting shaft of the connecting fitting 23 and the connecting portion 21a which is perpendicular to the flange 23a. The wheels 22a and 22b can also cause the dynamometer unit 20a to move in directions in which the connecting portion 21a moves closer to and away from the hub 2 of the motor vehicle 1. In the present embodiment, though not limited to, the wheels 22a and 22b are located below the connecting fitting 23 attached to the main body 21.

The wheels 22c and 22d, which can freely change their advancing direction over various angles in the horizontal direction, are for example universal casters which can freely change their advancing direction over 360 degrees in the horizontal direction. The wheels 22c and 22d are disposed in a direction along the extending direction of the connecting shaft of the connecting fitting 23 and the connecting portion 21a, and on the opposite side of the wheels 22a and 22b with respect to the main body 21.

Therefore, the dynamometer unit 20a can turn in such a way that the wheels 22c and 22d draw an arc with the wheels 22a and 22b as origins. Moreover, when the dynamometer unit 20a is connected to the hub 2 (see FIG. 1) via the connecting fitting 23, the wheels 22a and 22b are located in the vicinity below the hub 2, and the wheels 22c and 22d are located more distal to the hub 2 than the wheels 22a and 22b. For this reason, the dynamometer unit 20a can turn along with the hub 2 with the hub 2 as an origin when the steering wheel of the motor vehicle 1 is steered to the left or the right. The dynamometer 10 including such dynamometer unit 20a can test the running performance of the motor vehicle 1 while the steering wheel is being steered. Note that the wheels 22a and 22b may be a universal caster, and in this case as well, the dynamometer unit 20a can turn along with the hub 2.

Moreover, the base frame 22 has a bent portion 22f between the wheels 22a and 22b, and the wheels 22c and 22d. The base frame 22, which is bendable in the vertical direction at the bent portion 22f, can be bent to change the orientation of the main body 21 and the connecting fitting 23 in the up and down directions (in other words, upward and downward), that is, can be inclined so as to correspond to the orientation of a joining surface of the hub 2. The joining surface of the hub 2 is a surface with which the flange 23a of the connecting fitting 23 is brought into abutment.

Figure 3:
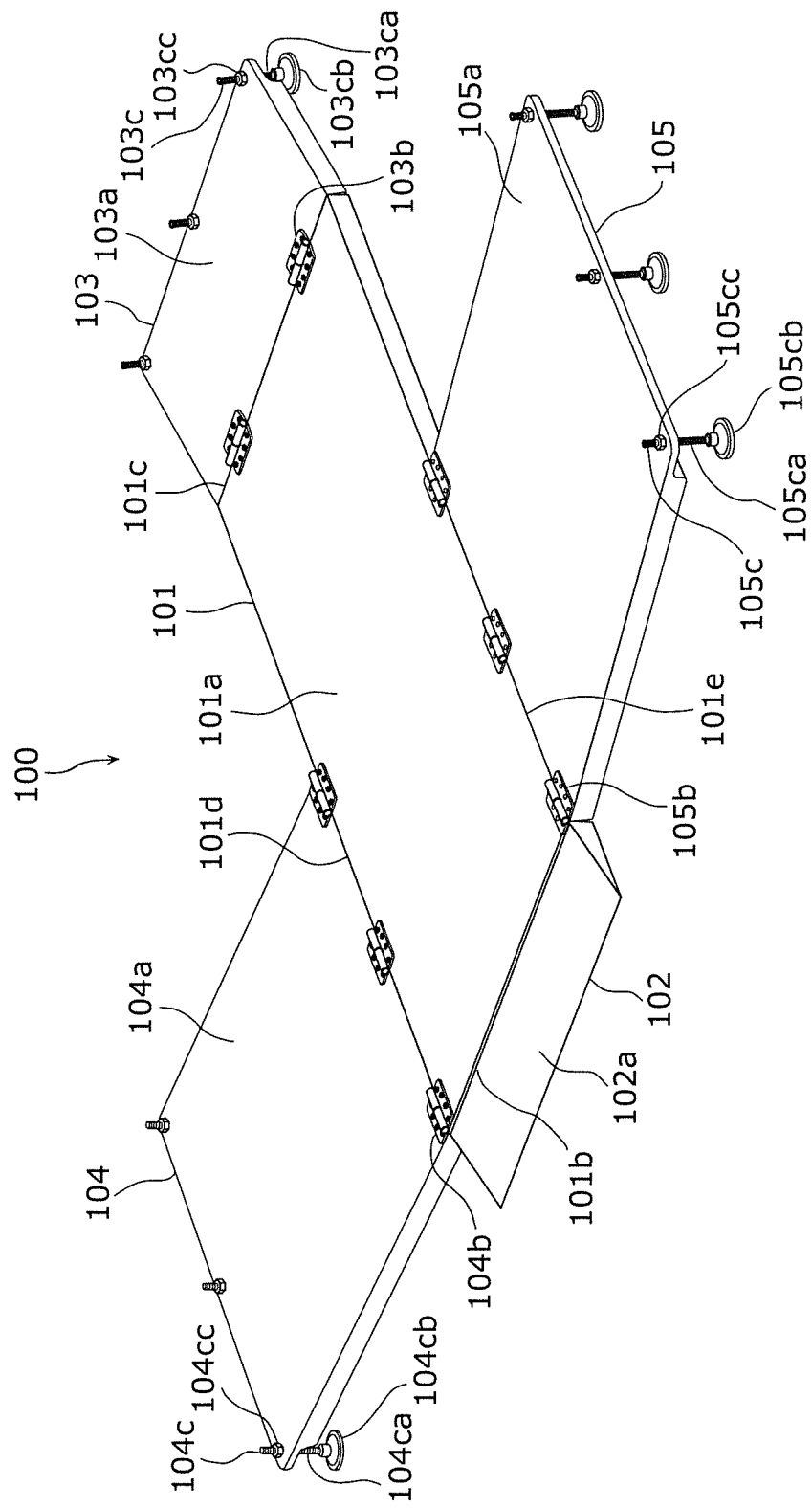
FIG. 3 is a schematic perspective view illustrating only the dynamometer load device of FIG. 2.
Figure 4:
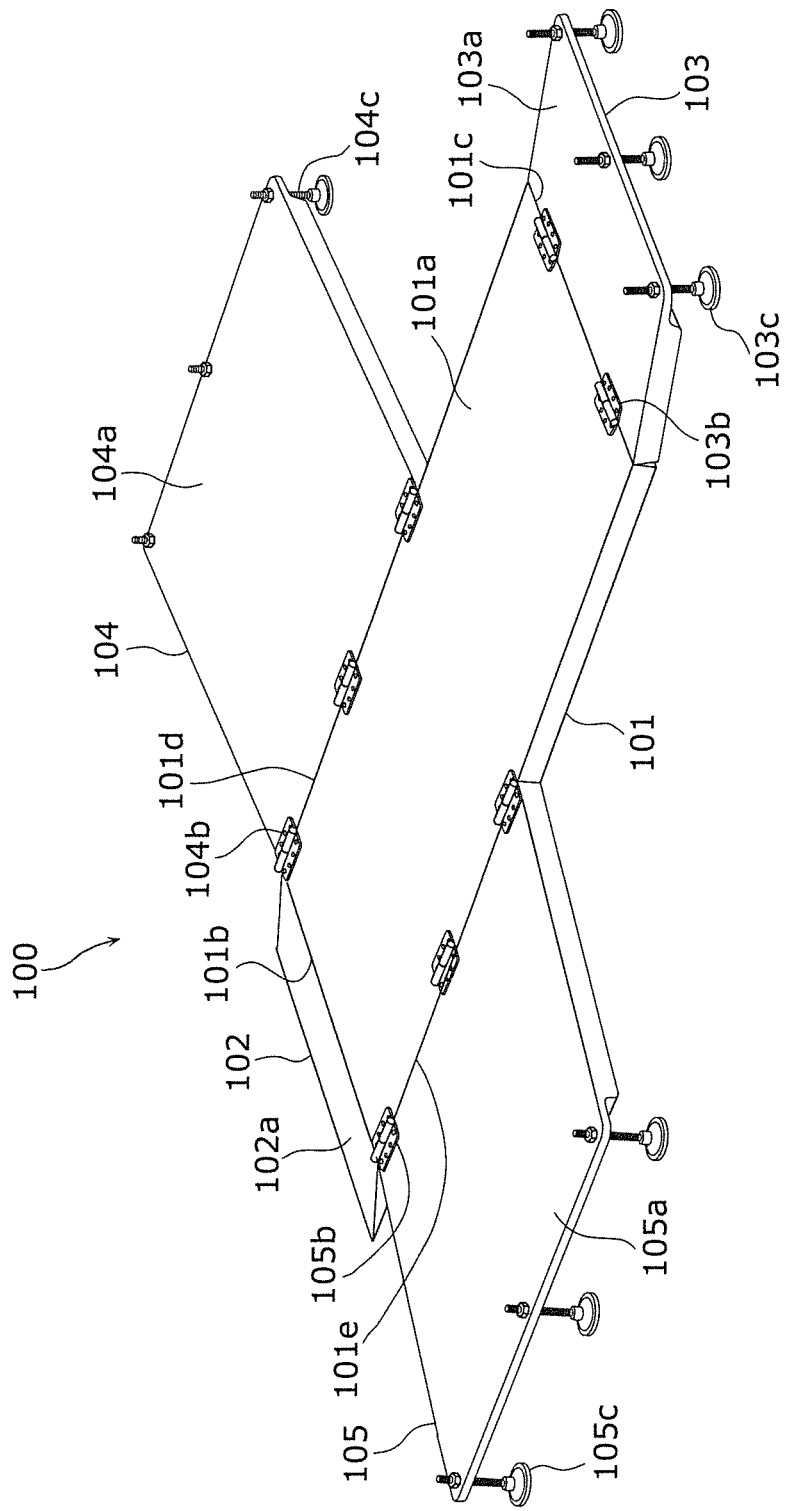
FIG. 4 is a schematic perspective view of the dynamometer load device of FIG. 3 seen from the motor vehicle toward the outside of the motor vehicle.

The dynamometer load device 100 according to Embodiment 1 is disposed between a supporting surface such as the ground surface, the floor surface, and the like, and the dynamometer unit 20a to support the dynamometer unit 20a. The dynamometer load device 100 is disposed with the dynamometer units 20a and 20b which are each connected to the front wheel of the motor vehicle 1. As shown in FIGS. 2 to 4, the dynamometer load device 100 constitutes a supporting stand having an inclined surface. Note that FIG. 3 is a schematic perspective view illustrating only the dynamometer load device 100 of FIG. 2. FIG. 4 is a schematic perspective view of the dynamometer load device 100 of FIG. 3 seen from the motor vehicle 1 toward the outside of the motor vehicle 1.

The dynamometer load device 100 includes a flat portion 101, a slope portion 102, and inclined portions 103, 104, and 105. The flat portion 101, the slope portion 102, and the inclined portions 103, 104, and 105 are formed of a planar member having a rectangular shape. The flat portion 101, the slope portion 102, and the inclined portions 103, 104, and 105 may be made up of inorganic material such as metal, or also may be made up of organic material such as resin, wood, and the like.

The flat upper surface 101a of the flat portion 101 forms a horizontal supporting surface when the flat portion 101 is placed on a horizontal supporting surface such as the ground surface, the floor surface, and the like. The slope portion 102 is disposed on one end portion 101b in the longitudinal direction of the flat portion 101, and is integrally connected with the end portion 101b. The upper surface 102a of the slope portion 102 forms an inclined surface having a downward inclination that increases as distance away from the flat portion 101 in the above described longitudinal direction.

A first inclined portion 103 is disposed on the other end portion 101c in the longitudinal direction of the flat portion 101, and is pivotably connected with this end portion 101c. The first inclined portion 103 is hinge-connected with the flat portion 101 by a joint member 103b such as a hinge, etc. The first inclined portion 103 pivots with respect to the flat portion 101 centering around the joint member 103b, and thereby the flat upper surface 103a of the first inclined portion 103 can form an inclined surface having a upward inclination that increases as distance away from the flat portion 101 in the above described longitudinal direction. That is, the upper surface 103a can form an inclined surface which is upwardly inclined from the outside of the motor vehicle 1 toward the hub 2.

A second inclined portion 104 and a third inclined portion 105 are respectively disposed at one side portion 101d in the lateral direction perpendicular to the longitudinal direction of the flat portion 101, and the other side portion 101e, and are pivotably connected with the one side portion 101d and the other side portion 101e. The second inclined portion 104 and the third inclined portion 105 are respectively hinge-connected with the flat portion 101 by the joint members 104b and 105b such as a hinge. The second inclined portion 104 and the third inclined portion 105 can respectively pivot with respect to the flat portion 101 centering around the joint members 104b and 105b. As a result of this, the flat upper surface 104a of the second inclined portion 104 can form an inclined surface having an upward inclination that increases as distance away from the flat portion 101 in the above described lateral direction. Similarly, the flat upper surface 105a of the third inclined portion 105 can form an inclined surface having an upward inclination that increases as distance away from the flat portion 101 in the above described lateral direction. Although this is not limiting, in the present embodiment, the second inclined portion 104 and the third inclined portion 105 are disposed at a location closer to the slope portion 102 than to the first inclined portion 103, specifically a location adjacent to the slope portion 102.

The inclined portions 103, 104, and 105 respectively include inclination adjustment portions 103c, 104c, and 105c which can change and fix the inclination angles of the inclined portions 103, 104, and 105 with respect to the flat portion 101.

A plurality of inclination adjustment portions 103c are provided, and in the first inclined portion 103, the plurality of inclination adjustment portions 103c are disposed in the vicinity of the end portion distal to the flat portion 101 and in one row along the end portion. Each inclination adjustment portion 103c has a shaft 103ca passing through the first inclined portion 103, a base portion 103cb that supports the shaft 103ca at a lower end, and a fixing member 103cc that fixes the shaft 103ca to the first inclined portion 103. The shaft 103ca has an outer peripheral surface on which threads are formed and is, although not limited to, a fully-threaded shaft in the present embodiment. The fixing member 103cc, which is a member having a screw hole, is for example, a nut. Two fixing members 103cc are attached to the shaft 103ca so as to hold the first inclined portion 103 therebetween. The two fixing members 103cc fix the shaft 103ca to the first inclined portion 103 by being fastened against the first inclined portion 103. By arbitrary changing the length of the shaft 103ca which protrudes downward from the first inclined portion 103, and fixing the shaft 103ca to the first inclined portion 103, the inclination adjustment portion 103c can fix the first inclined portion 103 at various inclination angles.

Similarly, in the second inclined portion 104, a plurality of inclination adjustment portions 104c are disposed in the vicinity of the end portion distal to the flat portion 101 and in one row along the end portion. Each inclination adjustment portion 104c includes a shaft 104ca, a base portion 104cb, and two fixing members 104cc. The two fixing members 104cc are attached to the shaft 104ca so as to hold the second inclined portion 104 therebetween, and fix the shaft 104ca to the second inclined portion 104 by being fastened to the second inclined portion 104. By arbitrary changing the length of the shaft 104ca which protrudes downward from the second inclined portion 104 and fixing the shaft 104ca to the second inclined portion 104, the inclination adjustment portion 104c can fix the second inclined portion 104 at various inclination angles.

Similarly, in the third inclined portion 105, the plurality of inclination adjustment portions 105c are disposed in the vicinity of the end portion distal to the flat portion 101 and in one row along the end portion. Each inclination adjustment portion 105c includes a shaft 105ca, a base portion 105cb, and two fixing members 105cc. The two fixing members 105cc are attached to the shaft 105ca so as to hold the third inclined portion 105 therebetween, and fix the shaft 105ca to the third inclined portion 105 by being fastened against the third inclined portion 105. By arbitrary changing the length of the shaft 105ca which protrudes downward from the third inclined portion 105 and fixing the shaft 105ca to the third inclined portion 105, the inclination adjustment portion 105c can fix the third inclined portion 105 at various inclination angles.

As shown in FIG. 2, the dynamometer unit 20a is placed on the upper surface 101a of the flat portion 101 of the dynamometer load device 100 when it is connected to the hub 2 of the motor vehicle 1. In this situation, the dynamometer load device 100 is disposed such that the first inclined portion 103 is positioned to be proximal to the hub 2, and the slope portion 102 is positioned to be distal to the hub 2. Specifically, the dynamometer load device 100 is disposed such that the longitudinal direction of the flat portion 101 lies along an axial direction of the drive shaft of the front wheel of the motor vehicle 1, which is connected to the hub 2. The axial direction of the drive shaft of the front wheel is also a direction substantially perpendicular to a joining surface of the hub 2 when the steering wheel is in a straight running state. In the dynamometer load device 100 disposed as described above, the second inclined portion 104 and the third inclined portion 105 lie along the right side portion of the motor vehicle 1. The second inclined portion 104 is positioned on the rear side of the motor vehicle 1 with respect to the flat portion 101, and the third inclined portion 105 is positioned on the front side of the motor vehicle 1 with respect to the flat portion 101. Then, the first inclined portion 103 is positioned below the hub 2. Further, the dynamometer unit 20a is put on the flat portion 101 through the slope portion 102.

Figure 5:
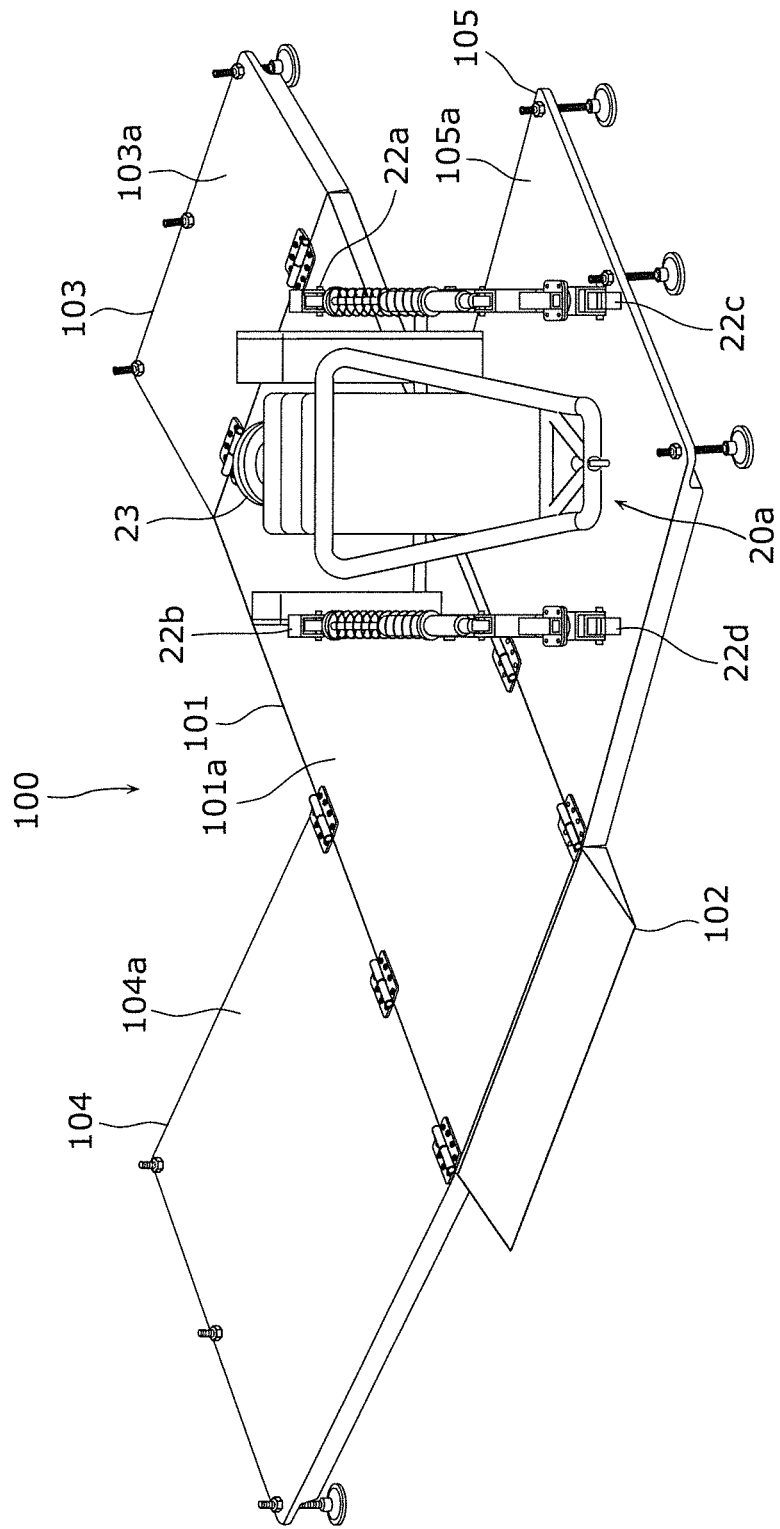
FIG. 5 is a schematic perspective view illustrating a dynamometer unit and a dynamometer load device when the steering wheel of the motor vehicle is steered to the left in FIG. 2.

As described above, the dynamometer unit 20a turns as the hub 2 turns when the steering wheel is steered to the left or the right in a state of being connected to the hub 2. For example, referring to FIG. 5, the dynamometer unit 20a is illustrated when the steering wheel is steered to the left. Note that FIG. 5 is a schematic perspective view illustrating the dynamometer unit 20a and the dynamometer load device 100 when the steering wheel of the motor vehicle 1 is steered to the left in FIG. 2. Since the dynamometer load device 100 demonstrates similar action on the dynamometer unit 20a when the steering wheel of the motor vehicle 1 is steered to the right as when the steering wheel is steered to the left, hereinafter, a case in which the steering wheel is steered to the left will only be described.

When the steering wheel is steered to the left, the dynamometer unit 20a turns counterclockwise with the hub 2 and the connecting fitting 23 as origins in a plan view seen from above. As a result of this, the wheel 22a moves in close to the first inclined portion 103, and the wheel 22b moves away from the first inclined portion 103. The wheel 22c moves onto the third inclined portion 105, and the wheel 22d moves in close to the third inclined portion 105 or moves onto the third inclined portion 105. The wheel 22d is positioned on the flat portion 101 when the steering amount of the steering wheel is relatively small, and is placed on the third inclined portion 105 when the steering amount of the steering wheel increases. Moreover, when the steering amount of the steering wheel increases, the wheel 22a of the dynamometer unit 20a may be placed on the first inclined portion 103.

The dynamometer unit 20a positioned on the third inclined portion 105 is subjected to force in the descending direction of the upper surface 105a, that is, in a direction opposite to the turning direction due to the inclination of the upper surface 105a with an upward inclination in the turning direction and gravity. This force acts as a load to steering of the steering wheel, and the operator of the steering wheel feels as if the steering wheel becomes heavy. Further, the above described force and load become larger in a case in which the only one wheel 22c is placed on the third inclined portion 105 than in a case in which two wheels 22c and 22d are placed thereon. Similarly, when the wheel 22a is placed on the first inclined portion 103, the dynamometer unit 20a is subjected to force in a direction opposite to the turning direction, and this force acts as a load to steering of the steering wheel. Therefore, the operator of the steering wheel can obtain steering feel via the steering wheel while steering, and can bodily experience a larger steering amount of the steering wheel from an increase in load, that is, weight bodily experienced through the steering wheel.

Moreover, the force in a direction opposite to the turning direction received by the dynamometer unit 20a as described above acts to move the dynamometer unit 20a toward the flat portion 101, that is, to return the steering wheel to a straight running state when the operator takes its hands off the steering wheel. Therefore, the dynamometer load device 100 can reproduce behavior of the steering wheel when the motor vehicle 1 travels through an intersection, a curve, and the like.

Moreover, by increasing the inclination angle of the first inclined portion 103, the first inclined portion 103 can inhibit the wheel 22a from advancing onto the first inclined portion 103, thereby limiting the turning movement of the dynamometer unit 20a. As a result of this, a steerable amount of the steering wheel is limited, and it is possible to restrict contact between the dynamometer unit 20a and the body of the motor vehicle 1 caused by oversteering of the steering wheel, for example.

As described above, the dynamometer load device 100 according to Embodiment 1 applies a load to the dynamometer unit 20a which is connected to the hub 2 of the wheel of the motor vehicle 1, and is movable. The dynamometer load device 100 applies a load in a direction opposite to the turning direction of the dynamometer unit 20a to the dynamometer unit 20a which turns along with the hub 2 as the steering wheel of the motor vehicle 1 is steered.

According to the above described configuration, the dynamometer load device 100 can apply a load to the dynamometer unit 20a which moves as the steering wheel is steered. The load in a direction opposite to the turning direction of the dynamometer unit 20a applies a load to the steering wheel, and thereby the operator of the steering wheel can obtain a steering feel via the steering wheel, and easily perform intended steering of the steering wheel. Thus, during a running test of the motor vehicle 1 by the dynamometer unit 20a, unintended steering of the steering wheel, such as abrupt operation of the steering wheel and oversteering, is suppressed thus allowing safer testing.

Moreover, the dynamometer load device 100 according to Embodiment 1 includes the upper surfaces 104a and 105a of the second inclined portion 104 and third inclined portion 105 as a first inclined surface on which the dynamometer unit 20a which moves in the above described turning direction is to be placed, in which the upper surfaces 104a and 105a are upwardly inclined in the above described turning direction. According to the above described configuration, the dynamometer load device 100 can apply a load in a direction opposite to the above described turning direction to the dynamometer unit 20a on the upper surface 104a or 105a by the inclination of the upper surfaces 104a and 105a and gravity.

Moreover, the dynamometer load device 100 according to Embodiment 1 includes an upper surface 103a of the first inclined portion 103 as a second inclined surface positioned in a moving direction of the dynamometer unit 20a which moves in the above described turning direction, in which the upper surface 103a is upwardly inclined from the outside of the motor vehicle 1 toward the hub 2. According to the above described configuration, the dynamometer load device 100 can apply a load in a direction opposite to the above described turning direction to the dynamometer unit 20a by the inclination of the upper surface 103a.

Moreover, the dynamometer load device 100 according to Embodiment 1 further includes inclination adjustment portions 103c to 105c which respectively adjust the inclination angles of the upper surfaces 103a to 105a of the inclined portions 103 to 105. According to the above described configuration, the dynamometer load device 100 can change the load to be applied to the dynamometer unit 20a which moves as the steering wheel is steered. Therefore, it is possible to adapt the above described load to running conditions of the motor vehicle 1 during a running test.

Moreover, in the dynamometer load device 100 according to Embodiment 1, the inclination adjustment portions 103c to 105c are screws which support the upper surfaces 103a to 105a of the inclined portions 103 to 105 and are screwed into the upper surfaces 103a to 105a. According to the above described configuration, adjustment of the inclination angle of the upper surfaces 103a to 105a of the inclined portions 103 to 105 can be realized by a simple configuration and cope with further fine adjustment.

[Variant 1]

Figure 6:
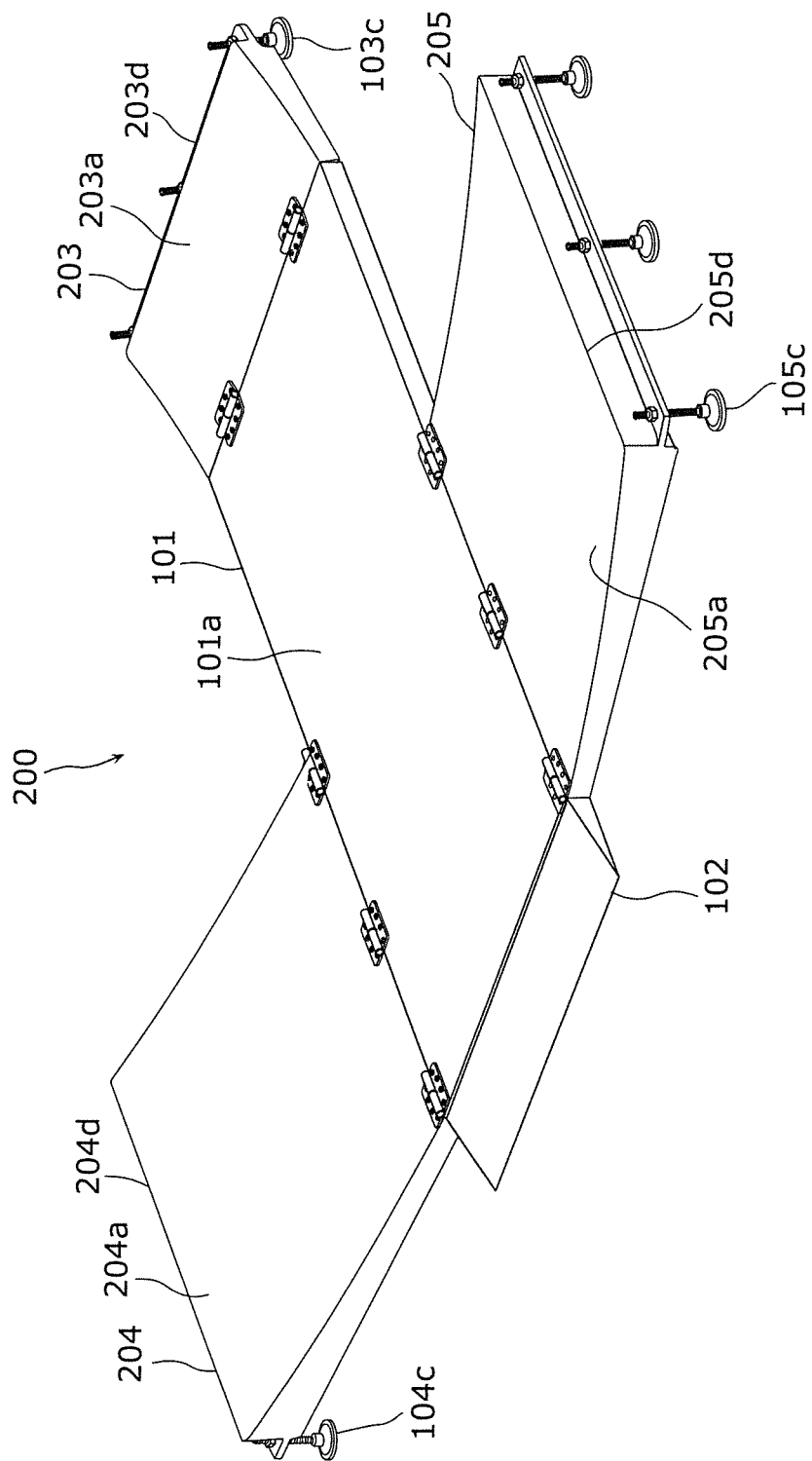
FIG. 6 is a schematic perspective view illustrating a dynamometer load device according to Variant 1 of Embodiment 1 in the same manner as in FIG. 3.
Figure 7:
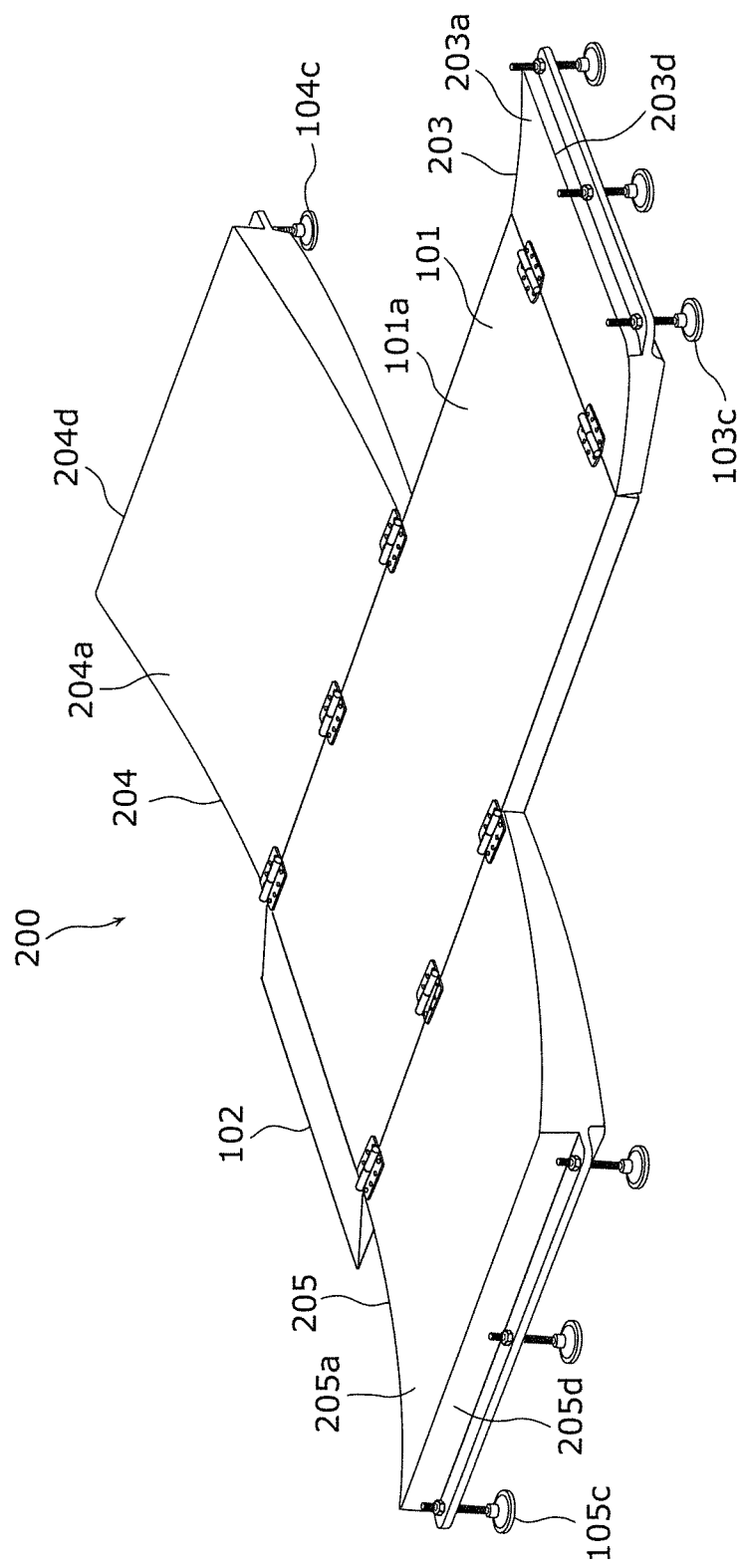
FIG. 7 is a schematic perspective view of the dynamometer load device according to Variant 1 in the same manner as in FIG. 4.

Variant 1 of the dynamometer load device according to Embodiment 1 will be described. Referring to FIGS. 6 and 7, a dynamometer load device 200 according to Variant 1 is illustrated. Note that FIG. 6 is a schematic perspective view illustrating the dynamometer load device 200 according to Variant 1 of Embodiment 1 in the same manner as in FIG. 3. FIG. 7 is a schematic perspective view illustrating the dynamometer load device 200 according to Variant 1 in the same manner as in FIG. 4.

As shown in FIGS. 6 and 7, although each one of the upper surfaces 103a, 104a, and 105a of the first inclined portions 103, 104, and 105 of the dynamometer load device 100 according to Embodiment 1 is a flat surface, each one of the upper surfaces 203a, 204a, and 205a of the inclined portions 203, 204, and 205 of the dynamometer load device 200 according to Variant 1 is a concave curved surface.

The upper surface 203a of the first inclined portion 203 may form a concave curved surface having an inclination that increases as distance away from the flat portion 101, forming a concave curved surface whose curvature changes, such as increases or decreases, or a concave curved surface whose curvature is constant. The direction to move away from the above described flat portion 101 is a direction from the flat portion 101 toward the end portion 203d of the first inclined portion 203 in which the inclination adjustment portion 103c is disposed. Although this is not limiting, in the present example, the position of the end portion 203d becomes highest at the upper surface 203a.

The upper surface 204a of the second inclined portion 204 may form a concave curved surface having an inclination that increases as distance away from the flat portion 101, forming a concave curved surface whose curvature changes, such as increases or decreases, or a concave curved surface whose curvature is constant. The direction to move away from the above described flat portion 101 is a direction from the flat portion 101 toward the end portion 204d of the second inclined portion 204 in which the inclination adjustment portion 104c is disposed. Although this is not limiting, in the present example, the position of the end portion 204*d* becomes highest at the upper surface 204*a*.

The upper surface 205*a* of the third inclined portion 205 may form a concave curved surface having an inclination that increases as distance away from the flat portion 101, forming a concave curved surface whose curvature changes, such as increases or decreases, or a concave curved surface whose curvature is constant. The direction to move away from the above described flat portion 101 is a direction from the flat portion 101 toward the end portion 205*d* of the third inclined portion 205 in which the inclination adjustment portion 105*c* is disposed. Although this is not limiting, in the present example, the position of the end portion 205*d* becomes highest at the upper surface 205*a*.

In either case in which the steering wheel is steered to the left or to the right, the dynamometer unit 20*a* is subjected to force in a direction opposite to the turning direction by the inclination of the upper surfaces 203*a*, 204*a*, and 205*a* of the inclined portions 203, 204, and 205. Further, as the steering amount of the steering wheel increases, the inclination of a portion in which the wheels 22*a* to 22*d* of the dynamometer unit 20*a* are positioned increases in the upper surfaces 203*a*, 204*a*, and 205*a*. Therefore, as the steering amount of the steering wheel increases, the force in a direction opposite to the turning direction to which the dynamometer unit 20*a* is subjected increases, that is, load to steering of the steering wheel increases. Therefore, the operator of the steering wheel can bodily experience a steering amount of the steering wheel through increase in the load, that is, weight which is bodily experienced through the steering wheel during steering.

As described above, in the dynamometer load device 200 according to Variant 1, each of the upper surfaces 204*a* and 205*a* of the inclined portions 204 and 205 is a surface having an inclination increasing in the turning direction of the dynamometer unit 20*a*. According to the above described configuration, the load by the dynamometer load device 200 which is applied to the dynamometer unit 20*a* in a direction opposite to the turning direction increases as the turning amount of the dynamometer unit 20*a* increases. As a result of this, the operator of the steering wheel can obtain steering feel according to the steering amount of the steering wheel from the steering wheel, and thereby recognize the steering amount.

Embodiment 2

The configuration of a dynamometer load device 300 according to Embodiment 2 will be described. The dynamometer load device 100 according to Embodiment 1 changes the inclination angle of the inclined surface on which the dynamometer unit is placed by using a screw-type inclination adjustment portion. The dynamometer load device 300 according to Embodiment 2 changes the inclination angle of the inclined surface, on which the dynamometer unit is placed, by using an actuator. Hereinafter, the dynamometer load device 300 according to Embodiment 2 will be described focusing on points of difference from Embodiment 1 and Variant 1.

Figure 8:
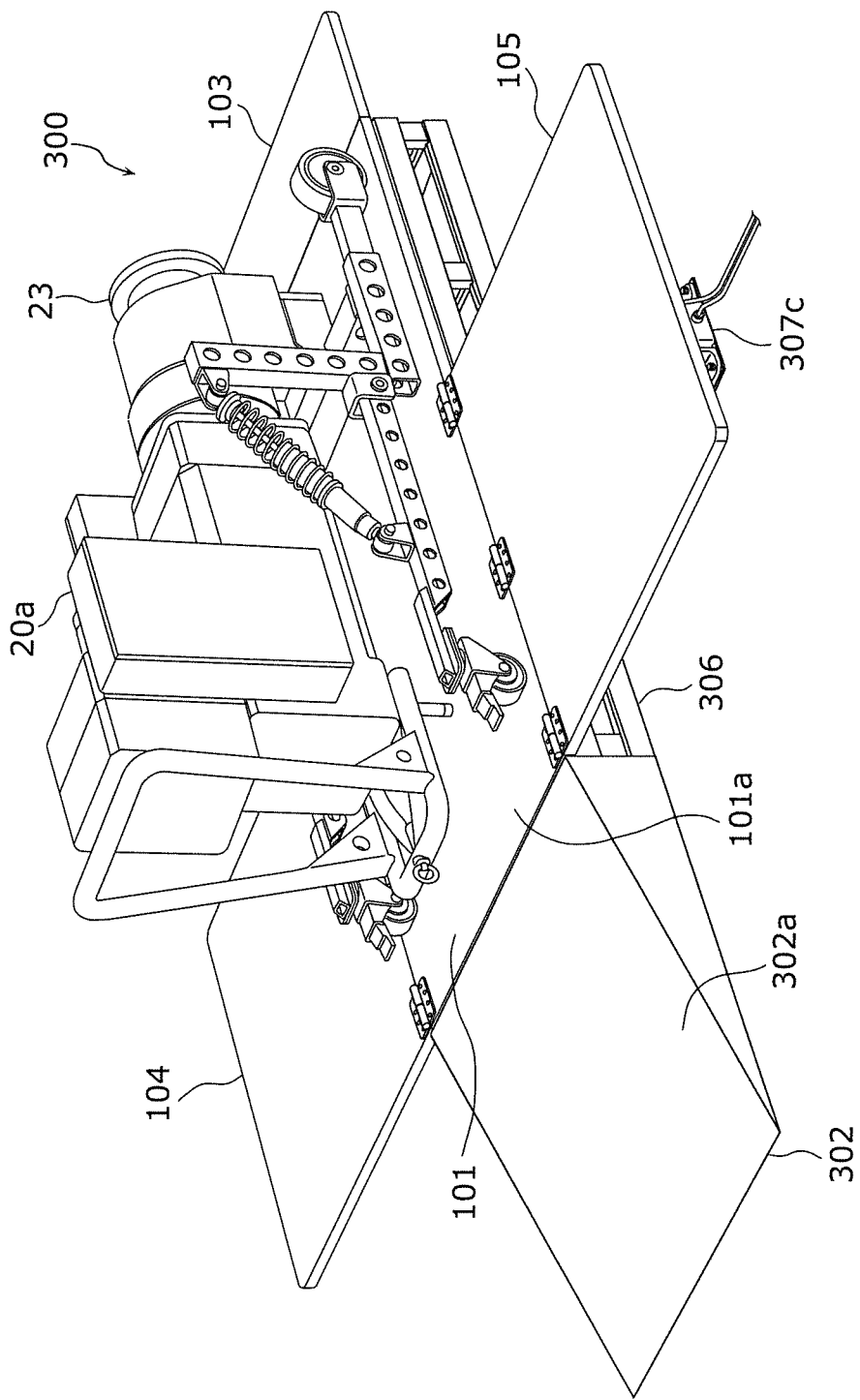
FIG. 8 is a schematic perspective view illustrating a state in which a dynamometer load device according to Embodiment 2 is set up with a dynamometer unit, in the same manner in FIG. 2.
Figure 9:
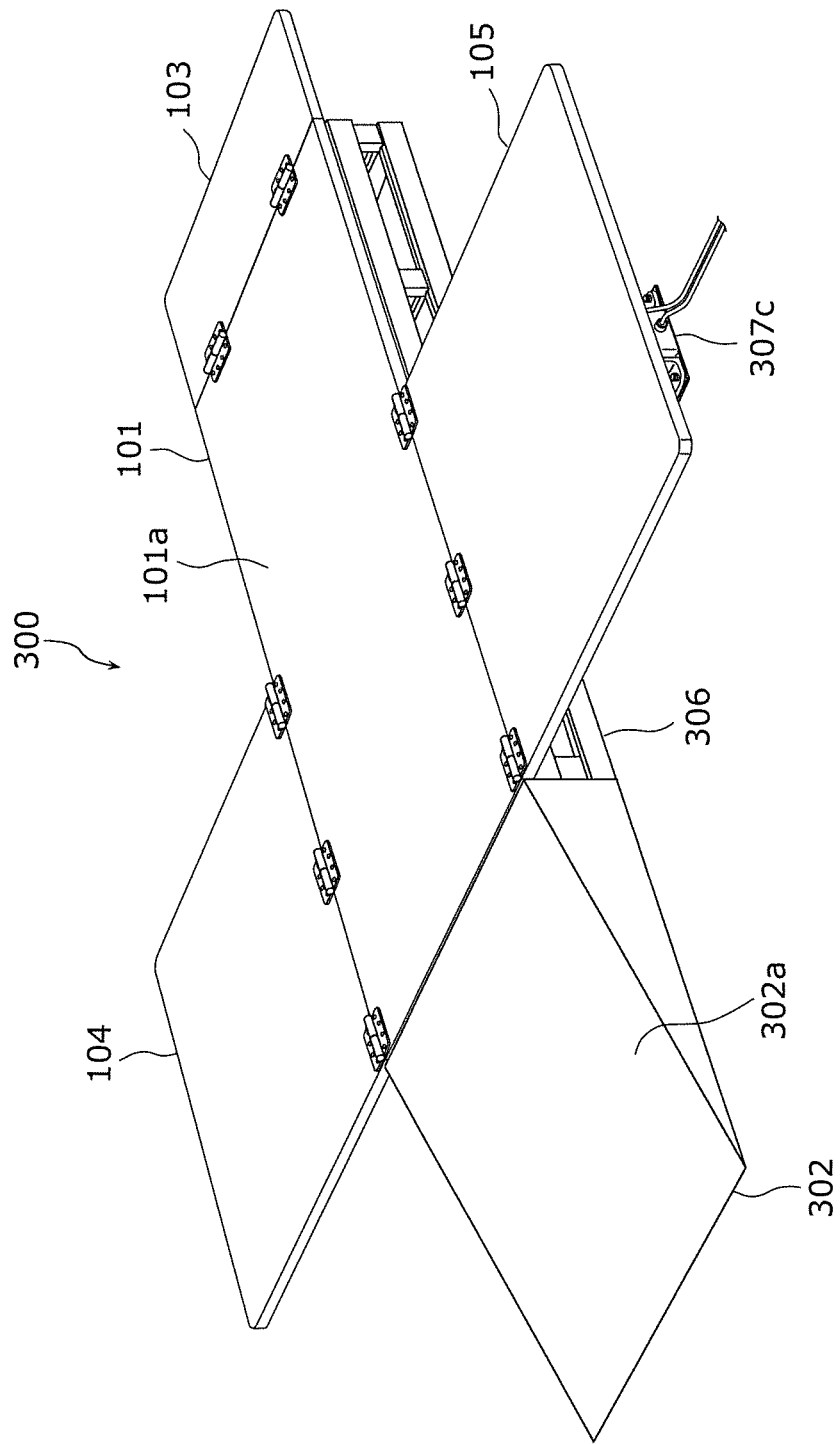
FIG. 9 is a schematic perspective view illustrating only the dynamometer load device of FIG. 8.

Referring to FIGS. 8 and 9, the dynamometer load device 300 according to Embodiment 2 is illustrated. Note that FIG. 8 is a schematic perspective view illustrating a state in which the dynamometer load device 300 according to Embodiment 2 is set up with the dynamometer unit 20*a* in the same manner as in FIG. 2. FIG. 9 is a schematic perspective view illustrating only the dynamometer load device 300 of FIG. 8. As shown in FIGS. 8 and 9, the dynamometer load device 300 according to Embodiment 2 includes a flat portion 101 and inclined portions 103 to 105 as with the dynamometer load device 100 according to Embodiment 1, and further includes a slope portion 302. Furthermore, the dynamometer load device 300 includes a base support 306 for supporting the flat portion 101 at a position higher than the supporting surface such as the ground surface and the floor surface. The upper surface 302*a* of the slope portion 302 forms an inclined surface extending from the upper surface 101*a* of the flat portion 101 of the base support 306 to the supporting surface.

Figure 10:
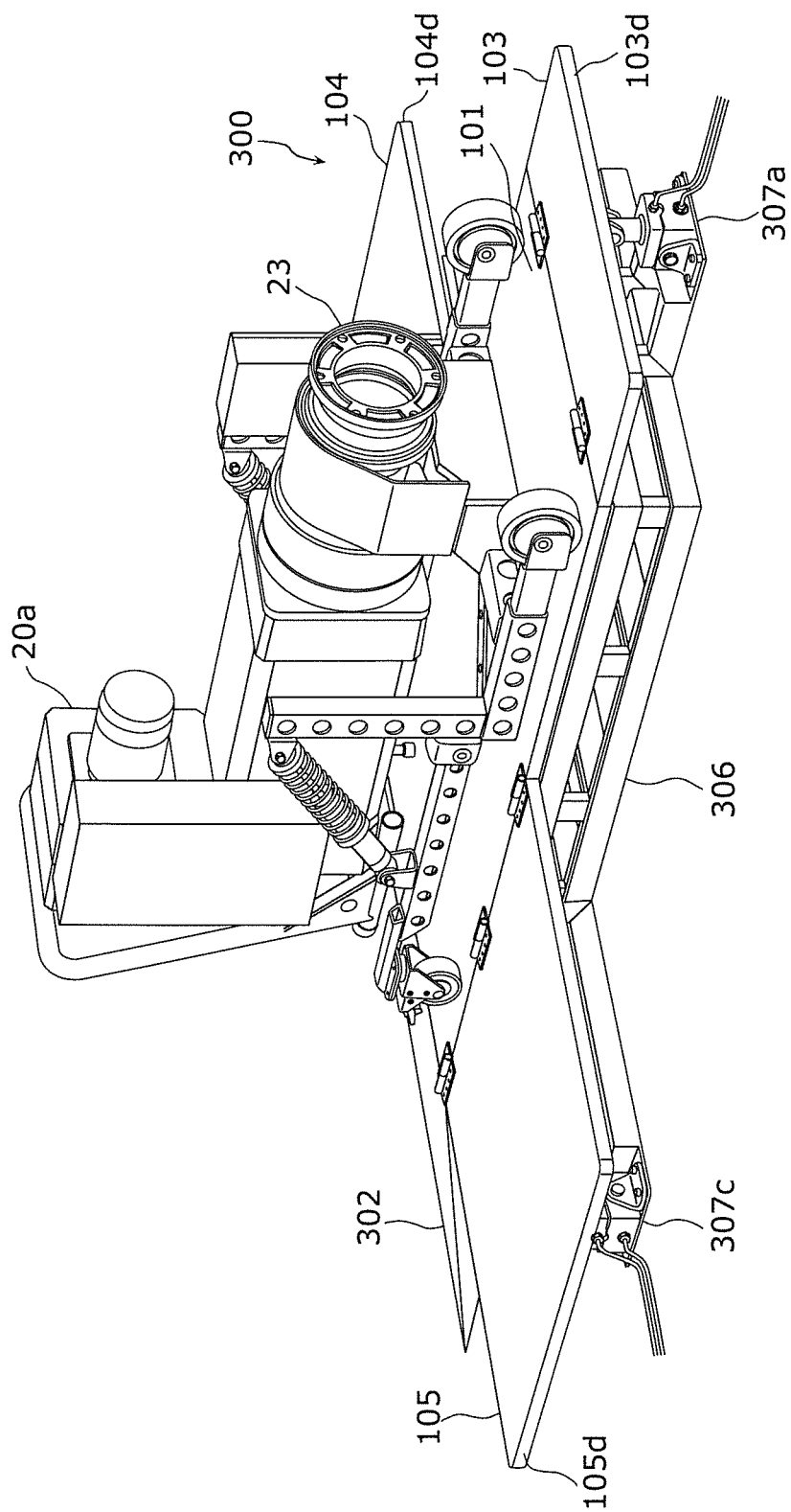
FIG. 10 is a schematic perspective view of the dynamometer load device and the dynamometer unit of FIG. 8 as seen from the motor vehicle toward the outside of the motor vehicle.
Figure 11:
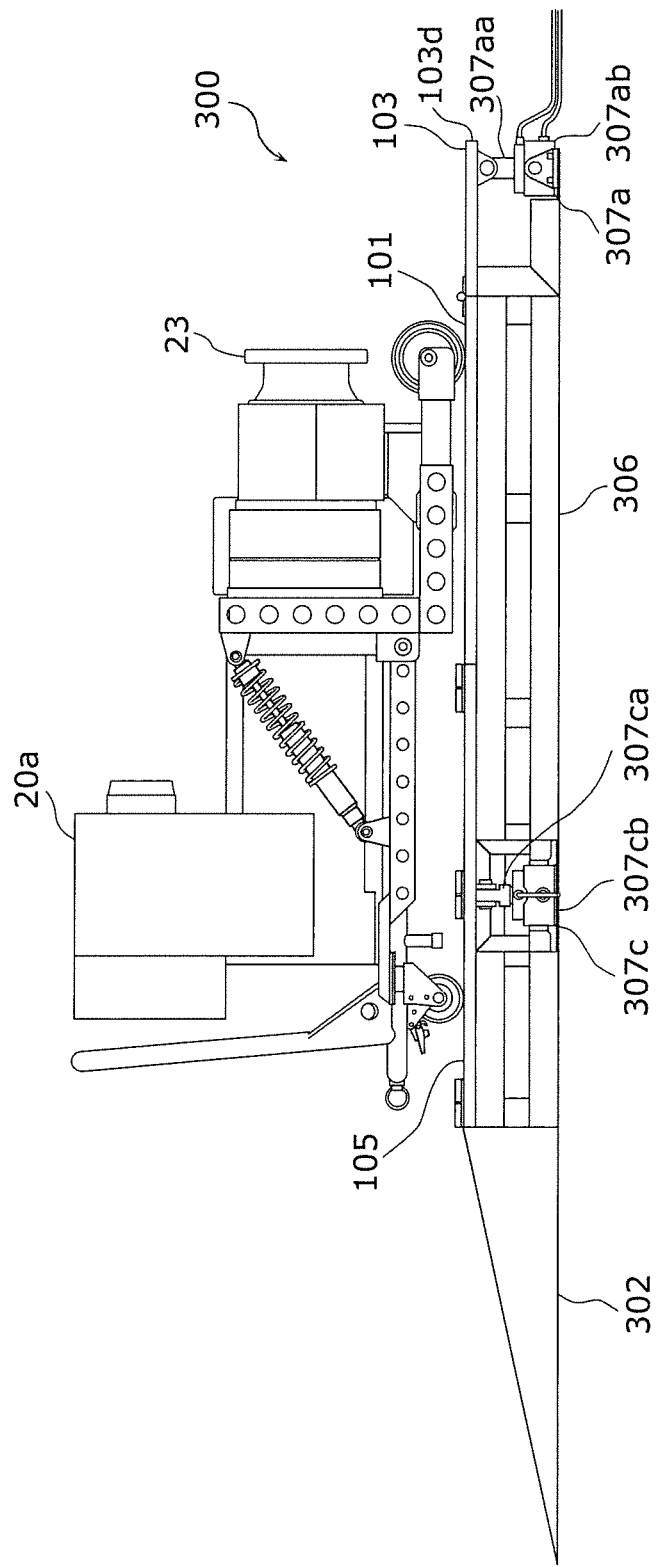
FIG. 11 is a schematic side view of the dynamometer load device and the dynamometer unit of FIG. 8 seen from the front of the motor vehicle toward the rear of the motor vehicle.
Figure 12:
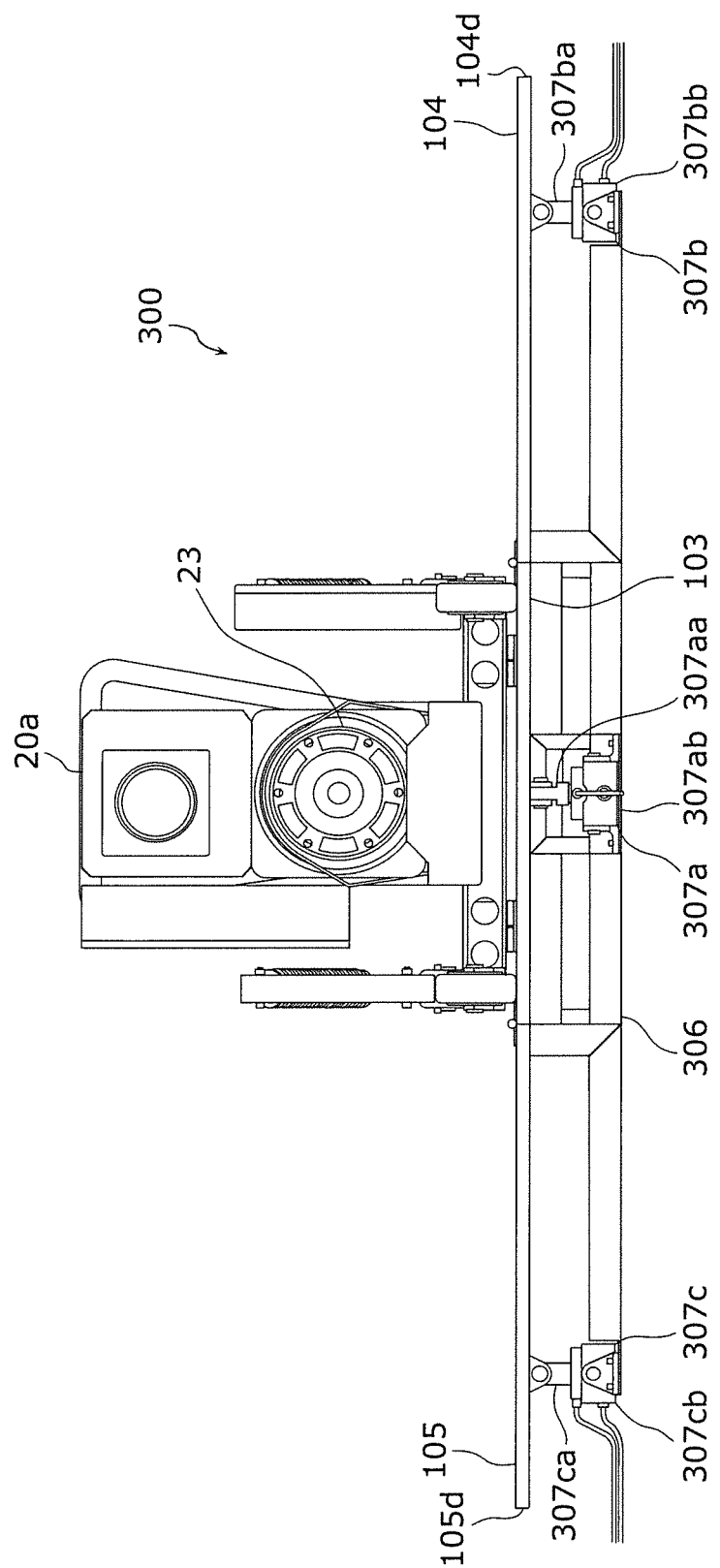
FIG. 12 is a schematic front view of the dynamometer load device and the dynamometer unit of FIG. 8 seen from the motor vehicle toward the outside of the motor vehicle.

Further, as shown in FIGS. 10 to 12, the dynamometer load device 300 includes supporting devices 307*a*, 307*b*, and 307*c* which support each of the inclined portions 103, 103, and 105 from below on the supporting surface. Note that FIG. 10 is a schematic perspective view of the dynamometer load device 300 and the dynamometer unit 20*a* of FIG. 8 seen from the motor vehicle 1 toward the outside of the motor vehicle 1. FIG. 11 is a schematic side view of the dynamometer load device 300 and the dynamometer unit 20*a* of FIG. 8 seen from the front of the motor vehicle 1 toward the rear of the motor vehicle 1. FIG. 12 is a schematic front view of the dynamometer load device 300 and the dynamometer unit 20*a* of FIG. 8 seen from the motor vehicle 1 toward the outside of the motor vehicle 1.

The supporting devices 307*a*, 307*b*, and 307*c* respectively include supporting shafts 307*aa*, 307*ba*, and 307*ca* which are able to extend and contract in up and down directions. The upper end of each of the supporting shafts 307*aa*, 307*ba*, and 307*ca* is connected as a link with the inclined portions 103, 104, and 105 in the vicinity of each of the end portions 103*d*, 104*d*, and 105*d*. As a result of this, each of the supporting shafts 307*aa*, 307*ba*, and 307*ca* can pivot with respect to the inclined portions 103, 104, and 105 with the connecting portions as origins.

Figure 13:
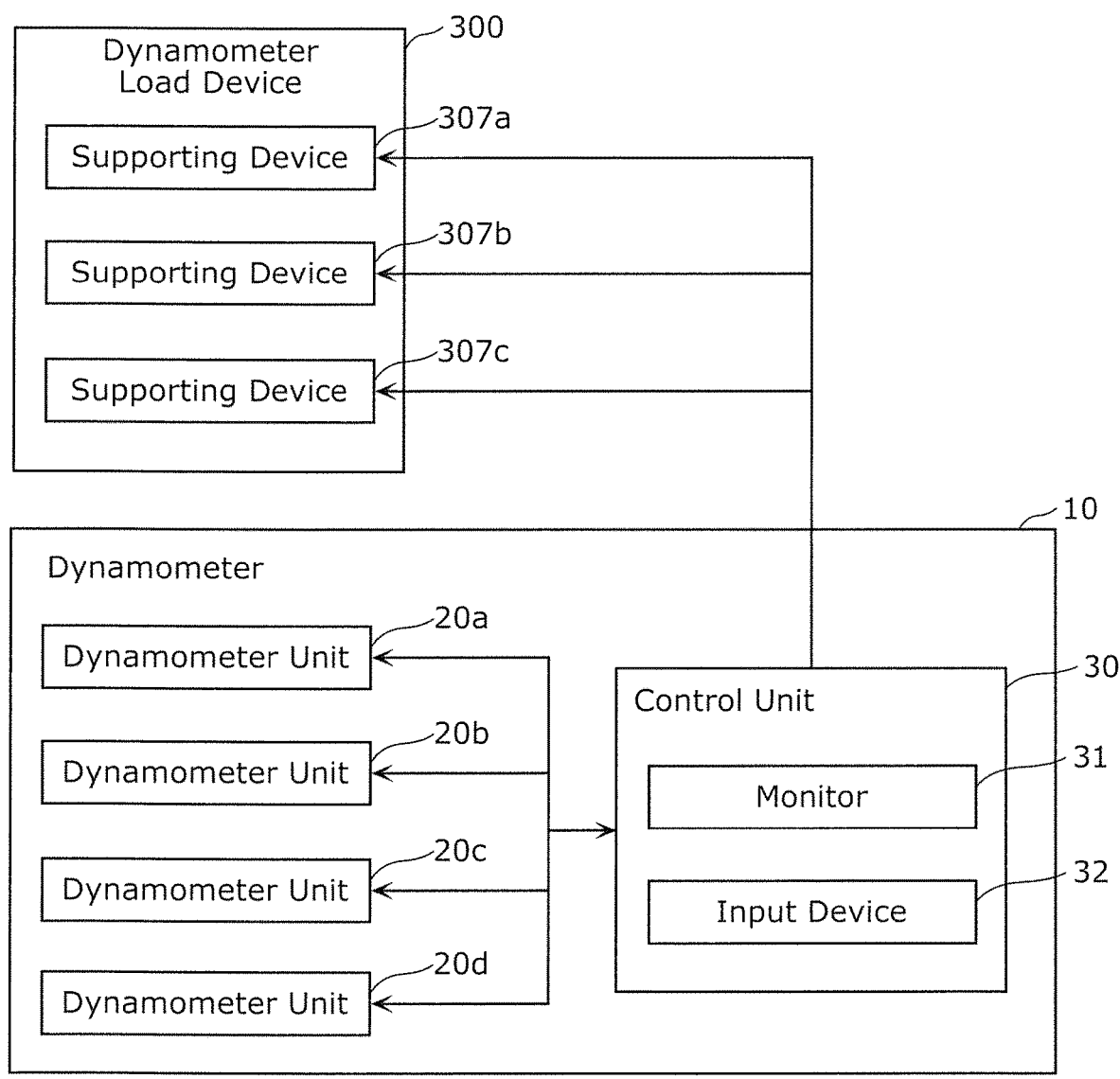
FIG. 13 is a block diagram illustrating a functional configuration of the dynamometer load device according to Embodiment 2.

Moreover, as shown in FIGS. 10 to 12, the supporting devices 307*a*, 307*b*, and 307*c* respectively include actuators 307*ab*, 307*bb*, and 307*cb* which cause the supporting shafts 307*aa*, 307*ba*, and 307*ca* to extend and contract in up and down directions. In the present embodiment, the actuators 307*ab*, 307*bb*, and 307*cb* are electric linear actuators. However, the actuators 307*ab*, 307*bb*, and 307*cb* may be, without being limited thereto, an actuator that makes different motion such as rotation, and may be one that is operated by a different driving source such as a hydraulic source and a pneumatic source. As shown in FIG. 13, the supporting devices 307*a*, 307*b*, and 307*c* are electrically connected with a control unit 30, and operate under the control of the control unit 30. Note that FIG. 13 is a block diagram illustrating a functional configuration of the dynamometer load device 300 according to Embodiment 2.

Figure 14:
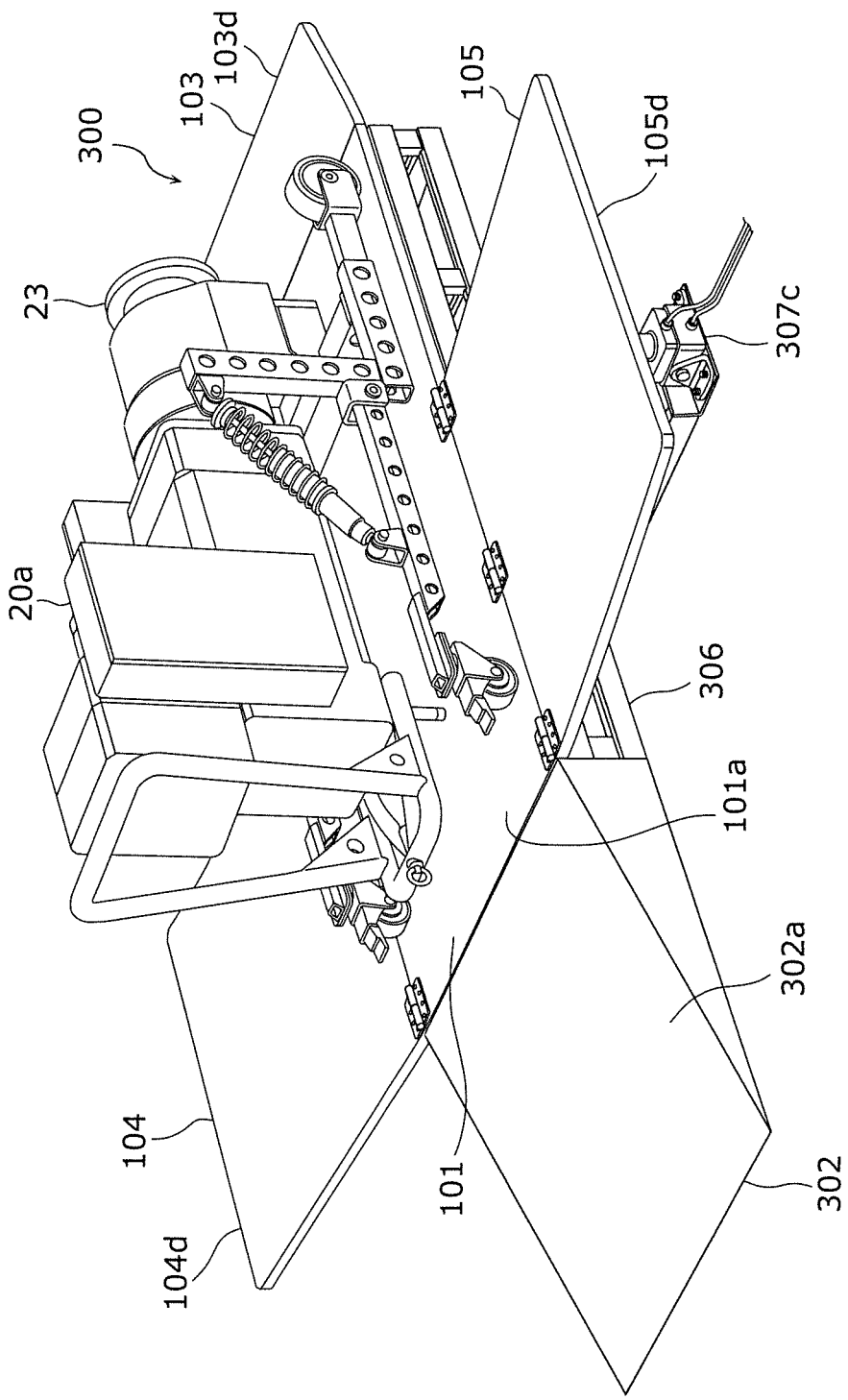
FIG. 14 is a schematic perspective view illustrating a state in which an inclination angle of the inclined portion of the dynamometer load device of FIG. 8 is changed.
Figure 15:
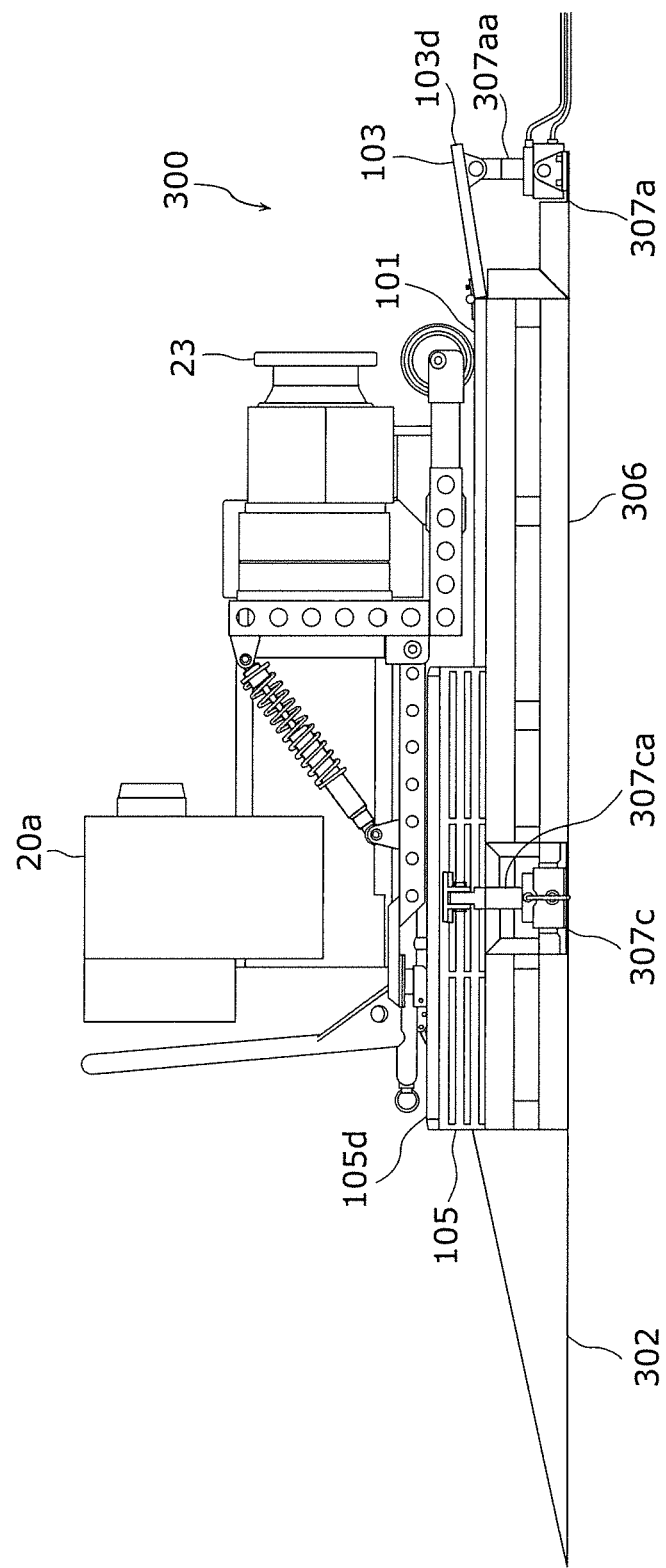
FIG. 15 is a schematic side view illustrating the dynamometer load device of FIG. 14 in the same manner as in FIG. 11.
Figure 16:
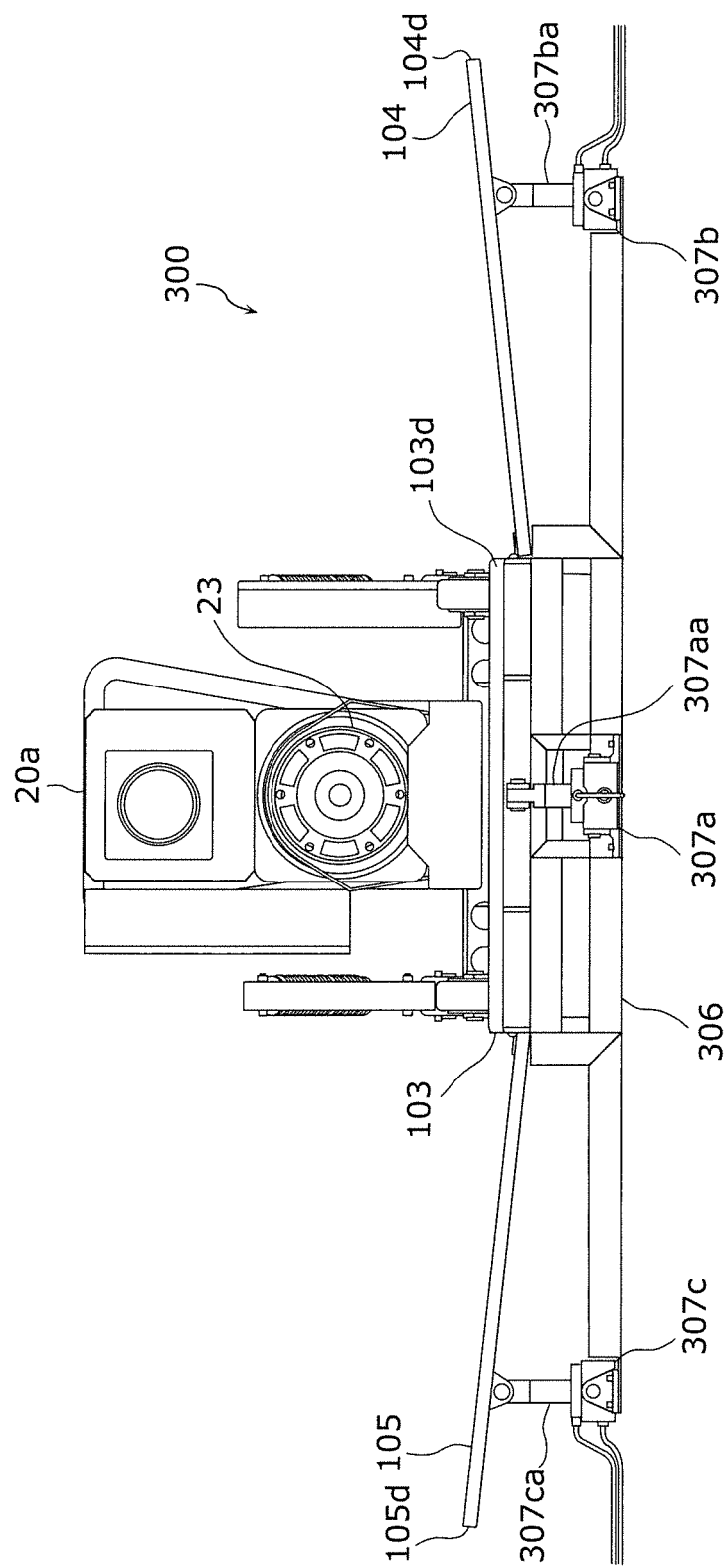
FIG. 16 is a schematic front view illustrating the dynamometer load device of FIG. 14 in the same manner as in FIG. 12.

As shown in FIGS. 14 to 16, the supporting devices 307*a*, 307*b*, and 307*c* as described above can respectively cause the inclined portions 103, 104, and 105 to be inclined at any inclination angle and maintain the inclined state by operating the supporting shafts 307*aa*, 307*ba*, and 307*ca*. For example, the supporting devices 307*a*, 307*b*, and 307*c* can respectively cause the inclined portions 103, 104, and 105 to form any of a horizontal state, an inclined state in which the end portions 103*d*, 104*d*, and 105*d* are raised, and an inclined state in which the end portions 103*d*, 104*d*, and 105*d* are lowered. Moreover, the control unit 30 controls each of the supporting devices 307*a*, 307*b*, and 307*c* based on a running condition, etc. of the motor vehicle 1, which is set via an input device 32 (see FIG. 13), to adjust the inclination angles of the inclined portions 103, 104, and 105 to predetermined inclination angles. Note that FIG. 14 is a schematic perspective view illustrating a state of the dynamometer load device 300 of FIG. 8, in which the inclination angles of the inclined portions 103, 104, and 105 are changed. FIG. 15 is a schematic side view illustrating the dynamometer load device 300 of FIG. 14 in the same manner as in FIG. 11. FIG. 16 is a schematic front view illustrating the dynamometer load device 300 of FIG. 14 in the same manner as in FIG. 12.

Thus, the dynamometer load device 300 causes the inclined portions 103, 104, and 105 to be inclined at any inclination angle easily and quickly by using the supporting devices 307a, 307b, and 307c.

As described above, in the dynamometer load device 300 according to Embodiment 2, the supporting devices 307a to 307c constitute an actuator that supports the upper surfaces 103a to 105a of the inclined portions 103 to 105, and extends and contracts in up and down directions. According to the above described configuration, the supporting devices 307a to 307c can change the inclination angle of the upper surfaces 103a to 105a by any amount at any time. For example, during a running test of the motor vehicle 1, it is possible to change the inclination angle of the upper surfaces 103a to 105a even in a state in which the dynamometer unit 20a is placed on the upper surfaces 103a to 105a. For example, the dynamometer load device 300 can change the inclination angles of the upper surfaces 103a to 105a according to a vehicle speed of the motor vehicle 1, and for example may increase the inclination angle as the vehicle speed increases. This makes it possible to inhibit occurrence of unintended steering operation according to the vehicle speed.

[Variant 2]

Variant 2 of the dynamometer load device according to Embodiment 2 will be described. A dynamometer load device 400 according to Variant 2 is one in which the inclined portions 203, 204, and 205 of the dynamometer load device 200 according to Variant 1 are applied to the inclined portions 103, 104, and 105 in the dynamometer load device 300 according to Embodiment 2. Hereinafter, the dynamometer load device 400 according to Variant 2 will be described focusing on points of difference from Embodiments 1 and 2, and Variant 1.

Figure 17:
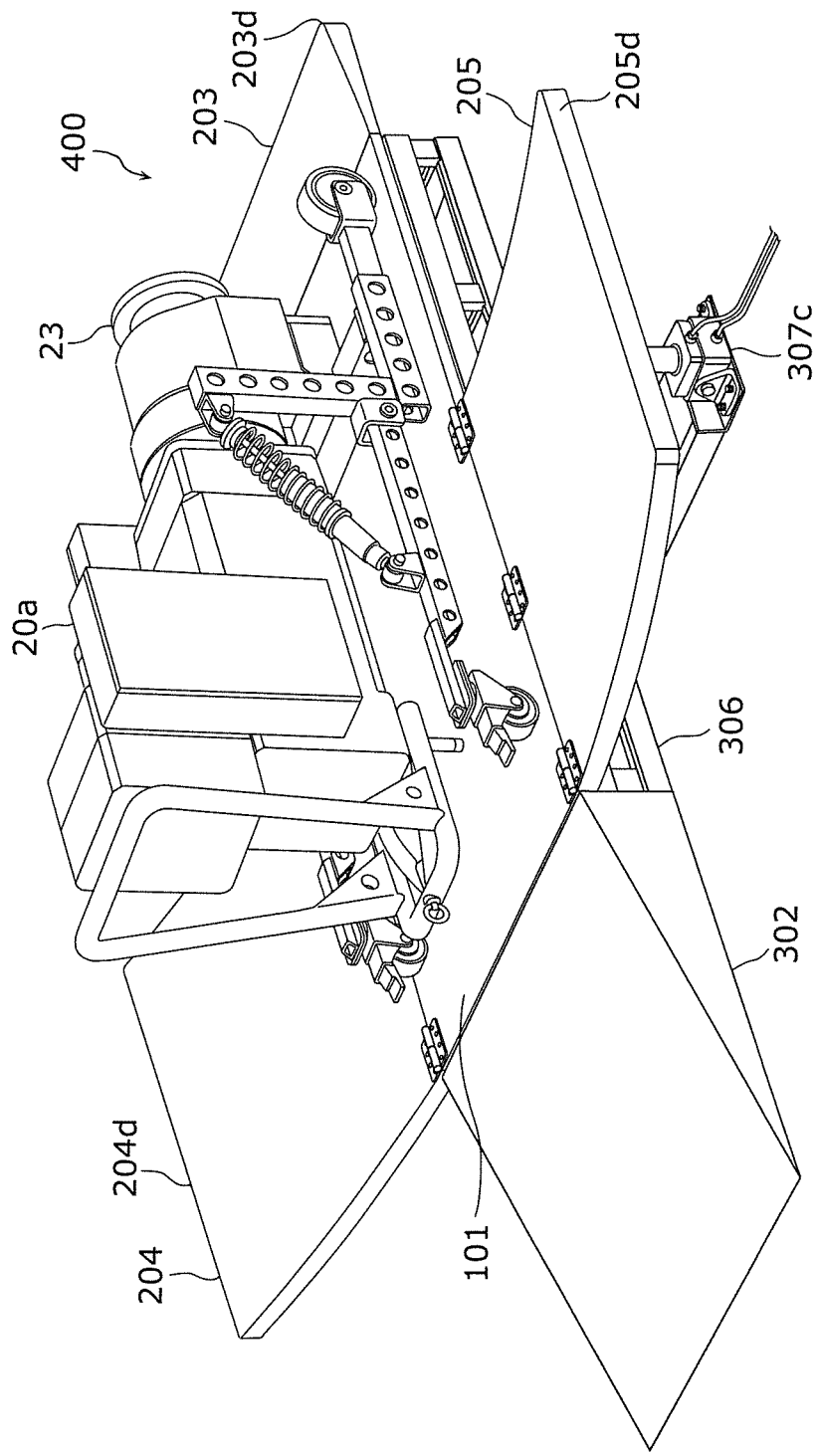
FIG. 17 is a schematic perspective view illustrating a dynamometer load device according to Variant 2 of Embodiment 2 in the same manner as in FIG. 8.
Figure 18:
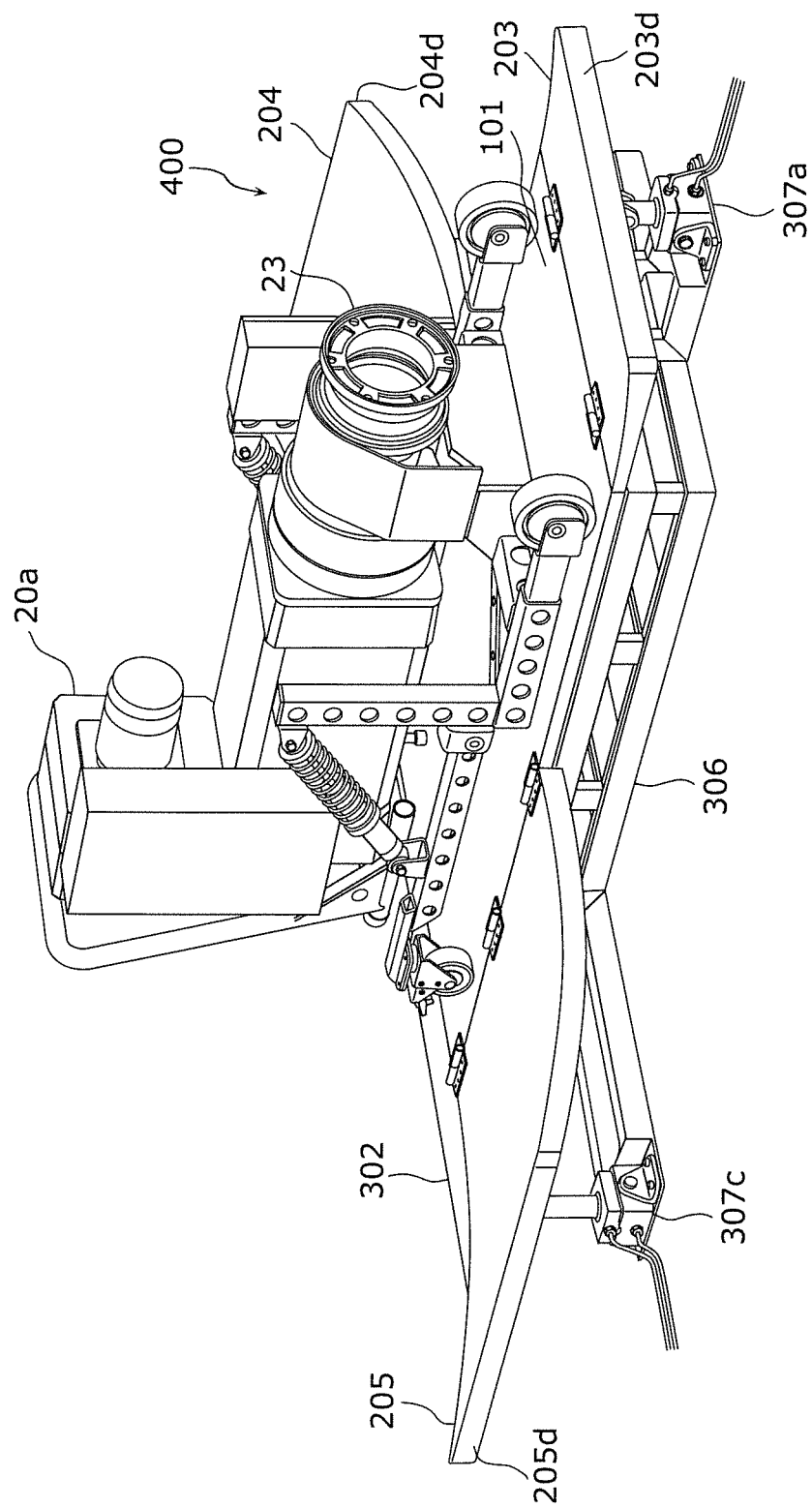
FIG. 18 is a schematic perspective view illustrating the dynamometer load device according to Variant 2 in the same manner as in FIG. 10.

As shown in FIGS. 17 and 18, the dynamometer load device 400 according to Variant 2 includes a flat portion 101, inclined portions 203 to 205, a slope portion 302, a base support 306, and supporting devices 307a to 307c of the inclined portions 203 to 205. The supporting shafts 307aa, 307ba, and 307ca of the supporting devices 307a, 307b, and 307c are respectively connected with the inclined portions 203, 204, and 205 as a link in the vicinity of the end portions 203d, 204d, and 205d. Note that FIG. 17 is a schematic perspective view illustrating the dynamometer load device 400 according to Variant 2 of Embodiment 2 in the same manner as in FIG. 8. FIG. 18 is a schematic perspective view illustrating the dynamometer load device 400 according to Variant 2 in the same manner as in FIG. 10.

The dynamometer load device 400 as described above causes the inclined portions 203, 204, and 205 to be inclined at any inclination angle easily and quickly by using the supporting devices 307a, 307b, and 307c. Further, the dynamometer load device 400 increases the force in a direction opposite to the turning direction to be applied to the dynamometer unit 20a as the steering amount of the steering wheel increases.

Embodiment 3

The configuration of a dynamometer load device 500 according to Embodiment 3 will be described. In Embodiments 1 and 2, and Variants 1 and 2, the inclined surface on which the dynamometer unit is placed during turning is used to apply a load in a direction opposite to the turning direction to the dynamometer unit. The dynamometer load device 500 according to Embodiment 3 applies a direct pulling force in a direction opposite to the turning direction to the dynamometer unit during turning of the dynamometer unit. Specifically, the dynamometer load device 500 causes the weight of a weight body to act on the dynamometer unit during turning of the dynamometer unit, thereby pulling the dynamometer unit in a direction opposite to the turning direction. Hereinafter, the dynamometer load device 500 according to Embodiment 3 will be described focusing on points of difference from Embodiments 1 and 2, and Variants 1 and 2.

Figure 19:
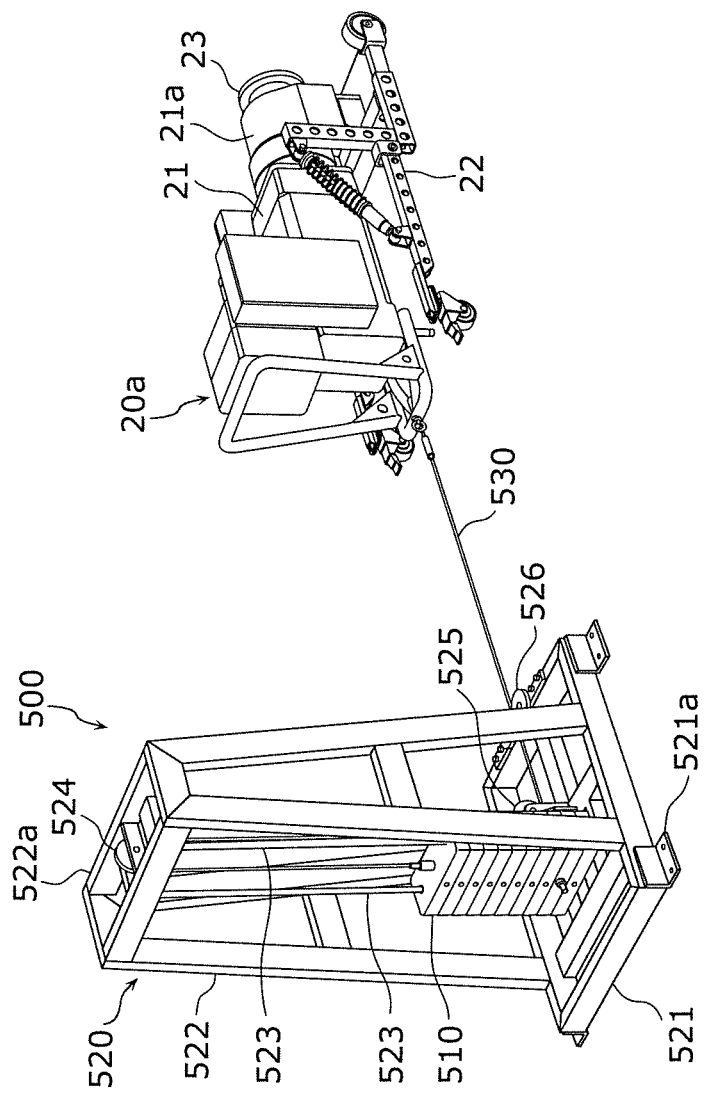
FIG. 19 is a schematic perspective view illustrating a state in which a dynamometer load device according to Embodiment 3 is set up with a dynamometer unit.
Figure 20:
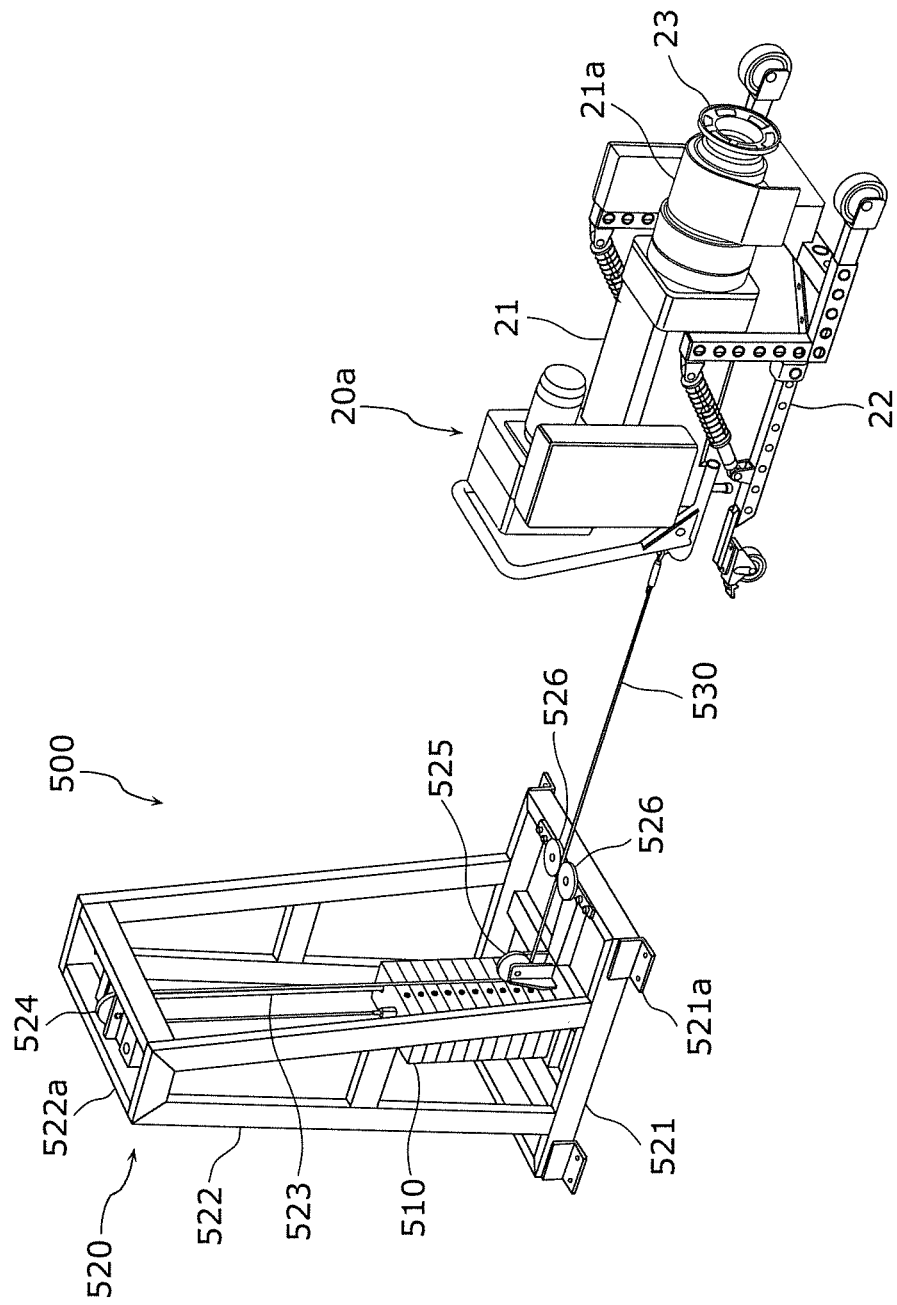
FIG. 20 is a schematic perspective view of the dynamometer load device and the dynamometer unit of FIG. 19 seen from the motor vehicle toward the outside of the motor vehicle.

Referring to FIGS. 19 and 20, the dynamometer load device 500 and the dynamometer unit 20a according to Embodiment 3 are illustrated. Note that FIG. 19 is a schematic perspective view illustrating a state in which the dynamometer load device 500 according to Embodiment 3 is set up with the dynamometer unit 20a. FIG. 20 is a schematic perspective view of the dynamometer load device 500 and the dynamometer unit 20a of FIG. 19 seen from the motor vehicle 1 toward the outside of the motor vehicle 1. FIGS. 19 and 20 illustrate the dynamometer unit 20a and the dynamometer load device 500 in a state in which the steering wheel of the motor vehicle 1 to which the dynamometer unit 20a is connected is in a straight running state.

The dynamometer load device 500 includes one or more weight bodies 510, a supporting frame 520 that supports the weight body 510, a connecting member 530 that connects the weight body 510 with the dynamometer unit 20a.

The supporting frame 520 integrally includes a base 521 which is placed on the supporting surface such as the ground surface and the floor surface, and a gate-shaped upper frame 522 which is disposed on the base 521. The base 521 has a fixing portion 521a which can be fixed to the supporting surface by a fixing member such as an anchor bolt. Note that the fixing portion 521a may not be included. Further, the supporting frame 520 includes two guide members 523 which guide the movement of the weight body 510 in up and down directions. The lower end of each guide member 523 is fixed to the base 521, and the upper end of each guide member 523 is fixed to a cross-bar portion 522a in the upper portion of the upper frame 522. The two guide members 523 extend in a vertical direction.

Each of the one or more weight bodies 510 has two holes through which two guide members 523 pass. Each of the one or more weight bodies 510 can move in up and down directions along the guide members 523 by being disposed in the supporting frame 520 with the two guide members 523 passing through the two holes. The one or more weight bodies 510 which have moved downward are supported on the base 521. The one or more weight bodies 510 are stacked on top of another along the guide member 523 and are connected and integrated with each other.

The connecting member 530, which is a flexible member, may be a linear member such as wire and chain, or a band-like member such as a belt. One end of the connecting member 530 is connected to the upper portion of the one or more weight bodies 510. The other end of the connecting member 530 is connected to the rear portion of the dynamometer unit 20a. The rear portion of the dynamometer unit 20a is an area on the opposite side of the connecting portion 21a in the dynamometer unit 20a. The rear portion of the dynamometer unit 20a may be positioned in the main body 21, or may be positioned in the base frame 22.

The connecting member 530 extends from the one or more weight bodies 510, passes through an upper roller 524, a lower roller 525, and between two guide rollers 526, and reaches the dynamometer unit 20a. The upper roller 524, which is disposed on the cross-bar portion 522a of the upper frame 522, changes the direction of the connecting member 530, which extends upwardly from the one or more weight bodies 510, to downward. The lower roller 525, which is disposed on the base 521, changes the direction of the connecting member 530, which extends downwardly from the upper roller 524, to a substantially horizontal direction. The two guide rollers 526, which are disposed on the base 521, guide the connecting member 530 toward the dynamometer unit 20a while fixing the horizontal position of the connecting member 530, which extends from the lower roller 525 in a substantially horizontal direction, at a predetermined position on the base 521. Thus, when the dynamometer unit 20a moves, the connecting member 530 can pull and lift up the one or more weight bodies 510.

Although this is not limiting, in the present embodiment, as shown in FIGS. 19 and 20, the dynamometer load device 500 is disposed such that the connecting member 530 extends linearly in a plan view from the lower roller 525 through the guide roller 526 to reach the dynamometer unit 20a when the dynamometer unit 20a is connected to the hub 2 of the motor vehicle 1 whose steering wheel is in a straight running state. In this situation, the weight body 510 is placed on the base 521. Therefore, no tension has occurred in the connecting member 530. The base 521 may be fixed to the supporting surface such as the ground surface and the floor surface.

Figure 21:
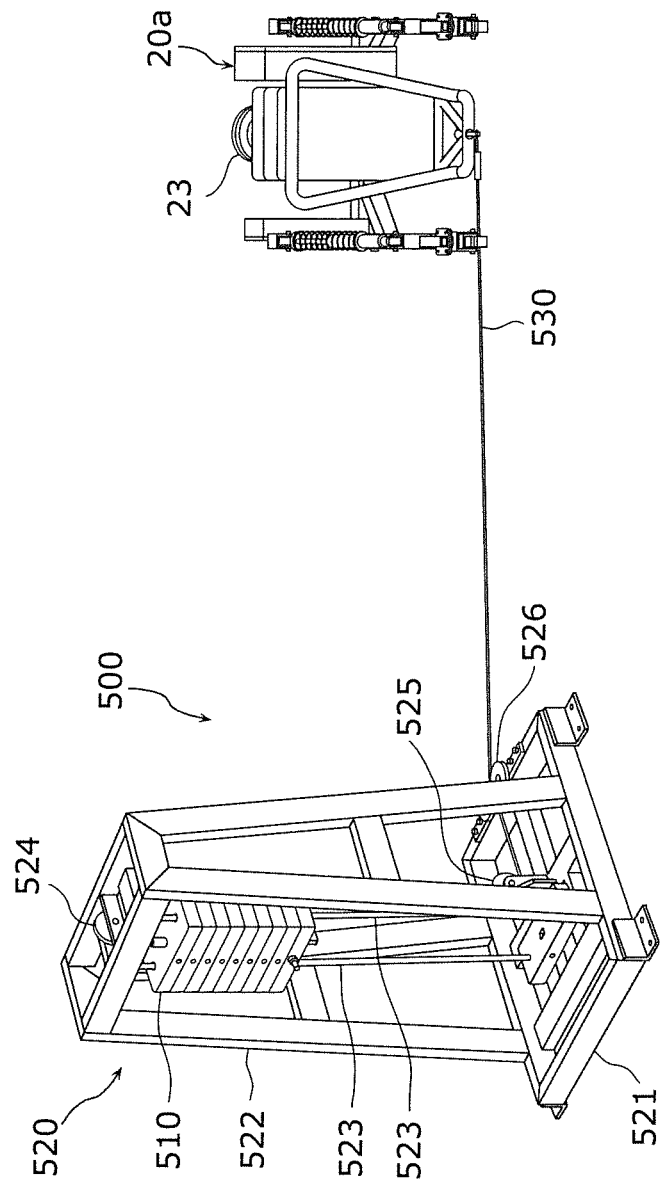
FIG. 21 is a schematic perspective view illustrating the dynamometer unit and the dynamometer load device when the steering wheel of the motor vehicle is steered to the left in FIG. 19.

For example, referring to FIG. 21, the dynamometer unit 20a and the dynamometer load device 500 when the steering wheel of the motor vehicle 1 is steered to the left in FIG. 19 are illustrated. As shown in FIG. 21, when the steering wheel is steered to the left and the dynamometer unit 20a turns in a counterclockwise direction, the dynamometer unit 20a pulls the connecting member 530 to lift the weight body 510 into the air. This is because the distance between the connecting portion of the connecting member 530 and the guide roller 526 in the dynamometer unit 20a increases at the time of steering to the left compared to the time when the steering wheel is in a straight running state. The weight of the weight body 510 which is lifted from the base 521 acts on the dynamometer unit 20a via the connecting member 530, and thereby the dynamometer unit 20a is pulled in a direction opposite to the turning direction. Therefore, the weight of the weight body 510 acts as a load to steering of the steering wheel. By changing the number of the weight bodies 510, it is possible to change the magnitude of load which is applied by the weight of the weight body 510 to steering of the steering wheel.

Moreover, the above described force, which is received by the dynamometer unit 20a from the weight body 510, in a direction opposite to the turning direction, acts so as to return the steering wheel to a straight running state when the operator takes its hands off the steering wheel. Therefore, the dynamometer load device 500 can reproduce the behavior of the steering wheel when the motor vehicle travels through an intersection, a curve, and the like.

Moreover, when the steering wheel is steered to the right as well, the weight of the weight body 510 acts as a load to steering of the steering wheel as when it is steered to the left. This is because when the steering wheel is in a straight running state, the connecting member 530 extends linearly from the lower roller 525 to the dynamometer unit 20a so that the distance between the connecting portion of the connecting member 530 and the guide roller 526 in the dynamometer unit 20a is minimum.

As described above, the dynamometer load device 500 according to Embodiment 3 includes a weight body 510, and a connecting member 530 that connects the weight body 510 with the dynamometer unit 20a. Further, the connecting member 530 transfers force received from the dynamometer unit 20a, which moves in the turning direction, to the weight body 510 as upward force. In the above described configuration, the dynamometer load device 500 can apply a load in a direction opposite to the above described turning direction to the dynamometer unit 20a by means of the weight of the weight body 510. For example, when the weight body 510 is lifted into the air by an upward force transferred from the connecting member 530 to the weight body 510, the weight of the weight body 510 acts as the above described load on the dynamometer unit 20a.

Moreover, in the dynamometer load device 500 according to Embodiment 3, although the dynamometer unit 20a is connected with one group of weight bodies by an integrated weight body 510 via one connecting member 530, this is not limiting. The dynamometer unit 20a may be connected with two or more groups of weight bodies via two or more connecting members 530. The two or more connecting members 530 may be connected to a rear portion of the dynamometer unit 20a, or to two opposed side portions positioned in the turning direction of the dynamometer unit 20a. For example, when two or more connecting members 530 and two groups of weight bodies are provided, one connecting member 530 may be connected with one side portion of the above described two side portions of the dynamometer unit 20a, and the other connecting member 530 may be connected with the other side portion of the above described two side portions. In this case, one group of weight bodies can apply a load to steering to the left of the steering wheel, and the other group of weight bodies can apply a load to steering to the right of the steering wheel.

Embodiment 4

The configuration of a dynamometer load device 600 according to Embodiment 4 will be described. In Embodiment 3, the weight of the weight body 510, which is lifted up by the dynamometer unit making a turn, is used to apply a load in a direction opposite to the turning direction to the dynamometer unit. The dynamometer load device 600 according to Embodiment 4 applies a load in a direction opposite to the turning direction to the dynamometer unit by using elastic force of an elastic member which is extended by the dynamometer unit making a turn. Hereinafter, the dynamometer load device 600 according to Embodiment 4 will be described focusing on points of difference from Embodiments 1 to 3, and Variants 1 and 2.

Figure 22:
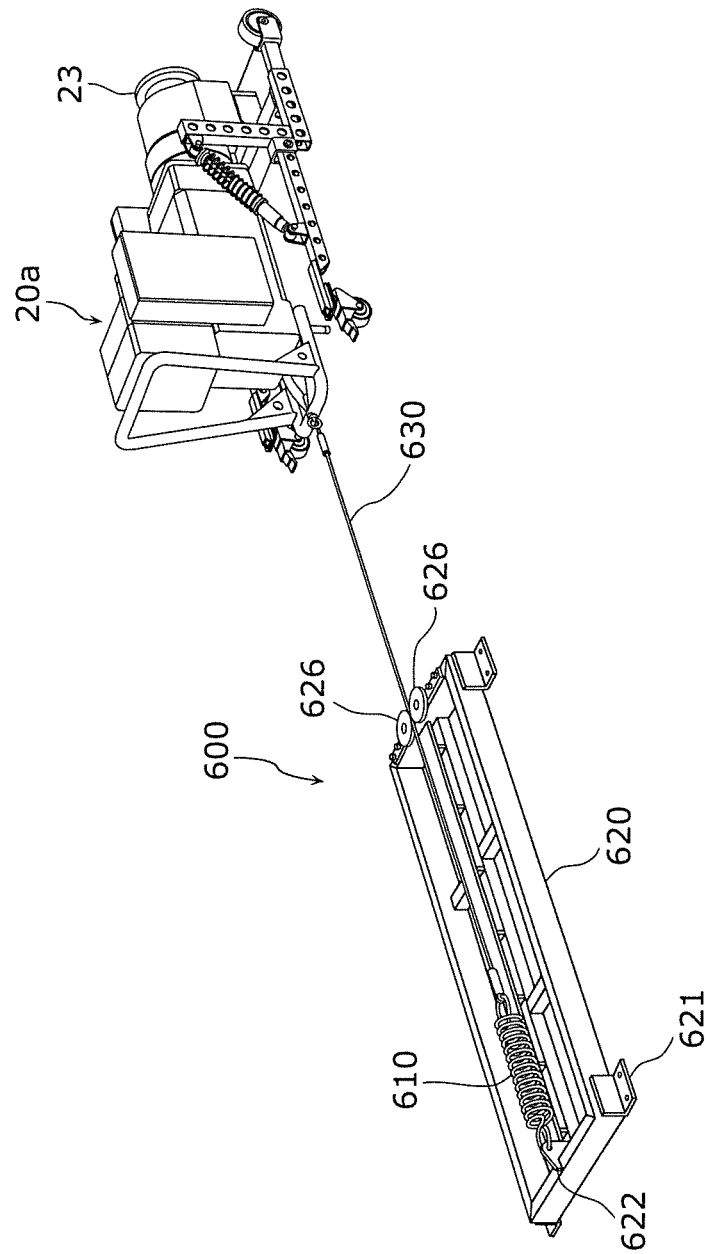
FIG. 22 is a schematic perspective view illustrating a state in which a dynamometer load device according to Embodiment 4 is set up with a dynamometer unit.

Referring to FIG. 22, the dynamometer load device 600 and the dynamometer unit 20a according to Embodiment 4 are illustrated. Note that FIG. 22 is a schematic perspective view illustrating a state in which the dynamometer load device 600 according to Embodiment 4 is set up with the dynamometer unit 20a. FIG. 22 illustrates the dynamometer unit 20a and the dynamometer load device 600 when the steering wheel of the motor vehicle 1 to which the dynamometer unit 20a is connected is in a straight running state.

The dynamometer load device 600 includes an elastic member 610, a supporting frame 620 that supports the elastic member 610, and a connecting member 630 that connects the elastic member 610 with the dynamometer unit 20a.

The supporting frame 620 forms, for example, a rectangular frame, and is configured to be placed on the supporting surface such as the ground surface or the floor surface. The supporting frame 620 includes a fixing portion 621 which can be fixed to the supporting surface with a fixing member such as an anchor bolt. Note that the fixing portion 621 may not be included. Further, the supporting frame 620 includes an attachment portion 622 to which an end portion of the elastic member 610 is attached. The attachment portion 622 is disposed, for example, in the vicinity of one end portion in the longitudinal direction of the supporting frame 620. The attachment portion 622 fixes the end portion of the elastic member 610 to the supporting frame 620. Moreover, the supporting frame 620 includes two guide rollers 626 for guiding the connecting member 630. The two guide rollers 626 are disposed, for example, in the vicinity of the other end portion in the longitudinal direction, that is, in the vicinity of the end portion on the opposite side of the attachment portion 622, of the supporting frame 620.

The elastic member 610 is a member which increases its elastic force by being extended. In the present embodiment, the elastic member 610 is a metallic coil spring. However, the elastic member 610 may be a non-metallic coil spring which is made of a polymeric material such as plastic or rubber, or ceramic, etc. or may be a linear or belt-shaped rubber member. One end of the elastic member 610 is fixed to the attachment portion 622, and the other end of the elastic member 610 is connected with the connecting member 630. The elastic member 610 is disposed on the supporting frame 620 so as to extend from the attachment portion 622 toward the guide rollers 626.

The connecting member 630 has similar configuration as that of the connecting member 530 in Embodiment 3. As described above, one end of the connecting member 630 is connected to the elastic member 610, and the other end of the connecting member 630 is connected to the rear portion of the dynamometer unit 20a in the same manner as in Embodiment 3. The connecting member 630 extends from the elastic member 610, passing through between the two guide rollers 626, to reach the dynamometer unit 20a. The two guide rollers 626 guide the connecting member 630 toward the dynamometer unit 20a while fixing the horizontal position of the connecting member 630 at a predetermined position of the supporting frame 620. Therefore, as the dynamometer unit 20a moves, the connecting member 630 can pull and extend the elastic member 610.

Although this is not limiting, in the present embodiment, as shown in FIG. 22, the dynamometer load device 600 is disposed such that the connecting member 630 extends linearly in a plan view from the attachment portion 622 through the guide rollers 626 to the dynamometer unit 20a when the dynamometer unit 20a is connected to the hub 2 of the motor vehicle 1 whose steering wheel is in a straight running state. In this situation, the elastic member 610 has contracted and no elastic force is generated. The supporting frame 620 may be fixed to the supporting surface such as the ground surface or the floor surface.

Figure 23:
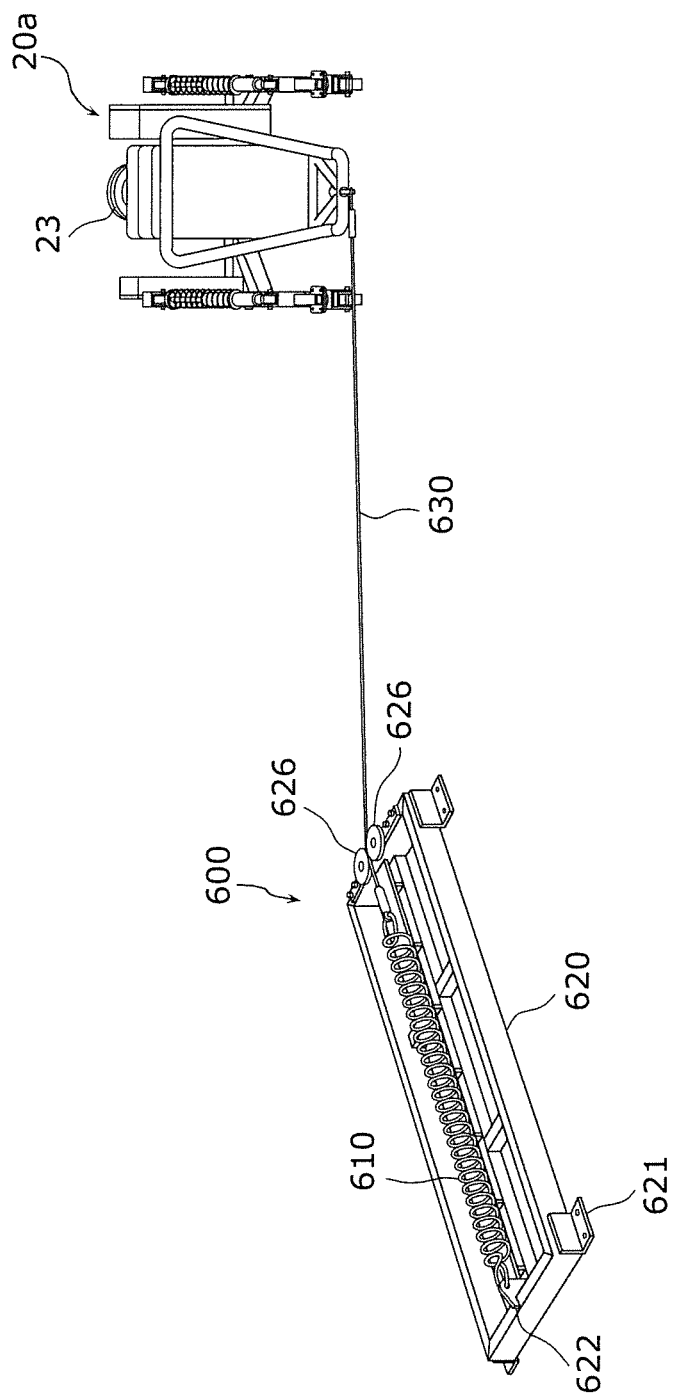
FIG. 23 is a schematic perspective view illustrating the dynamometer unit and the dynamometer load device when the steering wheel of the motor vehicle is steered to the left in FIG. 22.

For example, referring to FIG. 23, the dynamometer unit 20a and the dynamometer load device 600 when the steering wheel of the motor vehicle 1 is steered to the left in FIG. 22 are illustrated. As shown in FIG. 23, when the steering wheel is steered to the left and the dynamometer unit 20a turns in a counterclockwise direction in a plan view, the dynamometer unit 20a pulls the connecting member 630 and the elastic member 610 to extend the elastic member 610. This is because the distance between the connecting portion of the connecting member 630 and the guide roller 626 in the dynamometer unit 20a increases when the steering wheel is steered to the left compared to when the steering wheel is in a straight running state. The extended elastic member 610 generates elastic force, specifically elastic restoring force so that this elastic restoring force acts on the dynamometer unit 20a via the connecting member 630. As a result of this, the dynamometer unit 20a is subjected to elastic force that pulls it in a direction opposite to the turning direction. Further, since as the steering amount to the left of the steering wheel increases, the turning amount of the dynamometer unit 20a increases and the length of the elastic member 610 increases, the elastic restoring force that acts on the dynamometer unit 20a increases as well. Therefore, the elastic restoring force of the elastic member 610 acts as a load to steering of the steering wheel which varies according to the steering amount of the steering wheel. Moreover, by changing the elastic coefficient of the elastic member 610, or changing the number of the elastic members 610 to be connected to the connecting member 630, it is possible to change the magnitude of the load to be applied to steering of the steering wheel by the elastic restoring force of the elastic member 610.

Moreover, the above described force, which is received by the dynamometer unit 20a from the elastic member 610, in a direction opposite to the turning direction, acts so as to return the steering wheel to a straight running state when the operator takes its hands off the steering wheel. Therefore, the dynamometer load device 600 can reproduce the behavior of the steering wheel when the motor vehicle travels through an intersection, a curve, and the like.

Moreover, when the steering wheel is steered to the right as well, the elastic restoring force of the elastic member 610 acts as a load to steering of the steering wheel as when it is steered to the left. This is because when the steering wheel is in a straight running state, the connecting member 630 extends linearly from the attachment portion 622 to the dynamometer unit 20a so that the distance between the connecting portion of the connecting member 630 and the guide roller 626 in the dynamometer unit 20a is minimum.

As described above, the dynamometer load device 600 according to Embodiment 4 includes a reaction force generating member exemplified by the elastic member 610, and the connecting member 630 that connects the reaction force generating member with the dynamometer unit 20a. Further, the connecting member 630 transfers force received from the dynamometer unit 20a, which moves in the turning direction, to the reaction force generating member. In the above described configuration, the dynamometer load device 600 can apply a load in a direction opposite to the above described turning direction to the dynamometer unit 20a by means of reaction force which is generated by the reaction force generating member against the force transferred to the reaction force generating member.

Note that the reaction force generated by the reaction force generating member may be elastic force of the elastic member 610. By using the elastic member 610 as the reaction force generating member, it is possible to simplify the configuration. The elastic member 610 generates larger elastic force as the turning amount of the dynamometer unit 20a increases. Therefore, the operator of the steering wheel can obtain steering feel according to the steering amount of the steering wheel from the steering wheel, and thereby recognize the steering amount.

Moreover, in the dynamometer load device 600 according to Embodiment 4, although the elastic member 610 is configured to be pulled while the dynamometer unit 20a turns, the configuration will not be limited to this. For example, the connecting member 630 may be a rigid body, and the dynamometer unit 20a making a turn may press and contract the elastic member 610 via the connecting member 630, or the dynamometer unit 20a making a turn may directly press and contract the elastic member 610. Then, the contracted elastic member 610 may apply elastic restoring force to the dynamometer unit 20a.

Moreover, in the dynamometer load device 600 according to Embodiment 4, although the dynamometer unit 20a is connected with one elastic member 610 via one connecting member 630, this is not limiting. The dynamometer unit 20a may be connected with two or more elastic members 610 via two or more connecting members 630. The two or more connecting members 630 may be connected to the rear portion of the dynamometer unit 20a, or connected to two opposed side portions positioned in the turning direction of the dynamometer unit 20a. For example, when two connecting members 630 and two elastic members 610 are provided, one connecting member 630 may be connected with one side portion of the above described two side portions of the dynamometer unit 20a, and the other connecting member 630 may be connected with the other side portion of the above described two side portions. In this case, one elastic member 610 applies a load to steering to the left of the steering wheel, and the other elastic member 610 applies a load to steering to the right of the steering wheel.

Moreover, in the dynamometer load device 600 according to Embodiment 4, a linear actuator or a cylinder may be provided in place of the elastic member 610. The driving source of the linear actuator may be electricity, hydraulic pressure, pneumatic pressure, or the like. The linear actuator demonstrates similar action as that of the elastic member 610 by being configured such that when it is pulled and extended by the dynamometer unit 20a, it operates in a contracting direction to generate reaction force. The cylinder may be a hydraulic cylinder, a pneumatic cylinder, or the like. The cylinder demonstrates similar action as that of the elastic member 610 by being configured such that when it is pulled and extended by the dynamometer unit 20a, it generates reaction force in a contracting direction so as to return to an original state. Alternatively, the linear actuator and the cylinder may be configured such that they are pressed and contracted when the dynamometer unit 20a turns, and generates reaction force in an extending direction at that time. Note that when the linear actuator or the cylinder is provided as well, it may be configured, as with the elastic member 610, such that the dynamometer unit 20a making a turn presses the linear actuator or the cylinder.

[Other Variations]

Although the dynamometer load devices according to one or more aspects of the present invention have been described with reference to the embodiments as above, the present invention is not limited to these embodiments. Various modifications of the embodiments and their variations which those skilled in the art can conceive or desirable combinations of the structural elements and functions in the embodiments and their variations without materially departing from the present invention are also included in the present invention.

In the dynamometer load devices according to Embodiments 1 and 2, and Variants 1 and 2, although it is configured such that the first inclined portion 103, 203, the second inclined portion 104, 204, and third inclined portion 105, 205 respectively form an inclined surface on which the wheels of the dynamometer unit move, the configuration will not be limited to this. The first inclined portion 103, 203, the second inclined portion 104, 204, and third inclined portion 105, 205 may each have, in the upper surface thereof, a groove in which the wheels of the dynamometer unit move, and the bottom surface of the groove may be inclined. Alternatively, the first inclined portion 103, 203, the second inclined portion 104, 204, and the third inclined portion 105, 205 may each be a rail which guides the wheel of the dynamometer unit, and the contact surface with the wheel in the rail may be inclined.

REFERENCE SIGNS LIST

1 Motor vehicle
2 Hub
20a to 20d Dynamometer unit
30 Control unit
100, 200, 300, 400, 500, 600 Dynamometer load device
101 Flat portion
103 to 105, 203 to 205 Inclined portion
103a to 105a, 203a to 205a Upper surface (Inclined surface)
103c to 105c Inclination adjustment portion
307a to 307c Supporting device (Inclination adjustment portion)
510 Weight body
530, 630 Connecting member
610 Elastic member (Reaction force generating member)

The invention claimed is:

1. A dynamometer load device that applies a load to a dynamometer unit, the dynamometer unit being connected to a hub of a wheel of a motor vehicle and being movable, wherein
the dynamometer load device applies a load to the dynamometer unit in conjunction with steering of the motor vehicle, the dynamometer unit turning along with the hub, the load being applied in a direction opposite to a turning direction of the turning of the dynamometer unit.

2. The dynamometer load device according to claim 1, comprising:
a first inclined surface on which the dynamometer unit that moves in the turning direction is placed, wherein
the first inclined surface is upwardly inclined in the turning direction, and
the dynamometer load device applies the load in the direction opposite to the turning direction to the dynamometer unit on the first inclined surface by the first inclined surface and gravity.

3. The dynamometer load device according to claim 2, wherein
the first inclined surface is a curved surface having an inclination increasing in the turning direction.

4. The dynamometer load device according to claim 2, further comprising:
an inclination adjustment portion that adjusts an inclination angle of the first inclined surface.

5. The dynamometer load device according to claim 4, wherein
the inclination adjustment portion includes a screw, the screw supporting the first inclined surface and being screwed through the first inclined surface.

6. The dynamometer load device according to claim 4, wherein
the inclination adjustment portion includes an actuator, the actuator supporting the first inclined surface and vertically extending and contracting.

7. The dynamometer load device according to claim 1, comprising:

a second inclined surface that is positioned in a moving direction of the dynamometer unit that moves in the turning direction, wherein the second inclined surface is upwardly inclined from outside of the motor vehicle toward the hub, and the dynamometer load device applies the load in the direction opposite to the turning direction to the dynamometer unit by the second inclined surface.

8. The dynamometer load device according to claim 1, comprising:

a weight body; and a connecting member that connects the weight body to the dynamometer unit, wherein the connecting member transfers force received from the dynamometer unit that moves in the turning direction to the weight body as upward force, and the dynamometer load device applies the load in the direction opposite to the turning direction to the dynamometer unit by a weight of the weight body.

9. The dynamometer load device according to claim 1, comprising:

a reaction force generating member; and a connecting member that connects the reaction force generating member to the dynamometer unit, wherein the connecting member transfers force received from the dynamometer unit that moves in the turning direction to the reaction force generating member, and the dynamometer load device applies the load in the direction opposite to the turning direction to the dynamometer unit by reaction force, the reaction force being generated by the reaction force generating member against the force transferred to the reaction force generating member.

10. The dynamometer load device according to claim 9, wherein the reaction force generating member is an elastic member, and the reaction force generated by the reaction force generating member is elastic force of the elastic member.

11. The dynamometer load device according to claim 9, wherein the reaction force generating member is a cylinder, and the reaction force generated by the reaction force generating member is reaction force in a direction along which the cylinder extends or contracts.

12. The dynamometer load device according to claim 9, wherein the reaction force generating member is an actuator, and the reaction force generated by the reaction force generating member is force generated by operation of the actuator.

* * * * *

UNITED STATES PATENT AND TRADEMARK OFFICE
CERTIFICATE OF CORRECTION

PATENT NO. : 10,564,058 B2
APPLICATION NO. : 16/475919
DATED : February 18, 2020
INVENTOR(S) : Takeo Kiuchi et al.

It is certified that error appears in the above-identified patent and that said Letters Patent is hereby corrected as shown below:

On the Title Page

In Item (73), "TOYO Corporartion, Tokyo (JP)" should read --TOYO Corporation, Tokyo (JP)--

In the Specification

In Column 12, Line 14, "inclined portions 103, 103," should read --inclined portions 103, 104,--

Signed and Sealed this
Thirtieth Day of June, 2020

Andrei Iancu
*Director of the United States Patent and Trademark Office*